US012793366B2

(12) United States Patent
Braverman et al.

(10) Patent No.: US 12,793,366 B2
(45) Date of Patent: Nov. 10, 2026

(54) INTEGRATING A SEQUENCE OF 2D IMAGES OF AN OBJECT INTO A SYNTHETIC 3D SCENE

(71) Applicant: Voia Inc., Sunnyvale, CA (US)

(72) Inventors: Avner Braverman, Sunnyvale, CA (US); Haim Helman, San Jose, CA (US); Noam Malali, Tel Aviv (IL); Mitch Singer, Santa Ana, CA (US); Bryan Barber, Beverly Hills, CA (US); Ryan Fleischer, Groton, MA (US)

(73) Assignee: Voia Inc., Sunnyvale, CA (US)

( * ) Notice: Subject to any disclaimer, the term of this patent is extended or adjusted under 35 U.S.C. 154(b) by 152 days.

(21) Appl. No.: 18/806,120

(22) Filed: Aug. 15, 2024

(65) Prior Publication Data

US 2025/0069349 A1 Feb. 27, 2025

Related U.S. Application Data

(60) Provisional application No. 63/520,667, filed on Aug. 21, 2023.

(51) Int. Cl.
*G06T 19/20* (2011.01)
*G06T 7/13* (2017.01)
(Continued)

(52) U.S. Cl.
CPC ................ *G06T 19/20* (2013.01); *G06T 7/13* (2017.01); *G06T 7/20* (2013.01); *G06T 13/00* (2013.01);
(Continued)

(58) Field of Classification Search
CPC .. G06T 19/20; G06T 7/13; G06T 7/20; G06T 19/006; G06T 2219/2016;
(Continued)

(56) References Cited

U.S. PATENT DOCUMENTS 5,696,892 A * 12/1997 Redmann ................ G06T 13/20 348/E5.022
5,936,626 A * 8/1999 Beasley .................. G06T 15/20 345/582
(Continued)

OTHER PUBLICATIONS

Aubel, Amaury, Ronan Boulic, and Daniel Thalmann. "Animated impostors for real-time display of numerous virtual humans." In International Conference on Virtual Worlds, pp. 14-28. Berlin, Heidelberg: Springer Berlin Heidelberg, 1998. (Year: 1998).*
(Continued)

*Primary Examiner* — King Y Poon
*Assistant Examiner* — Vincent Peren
(74) *Attorney, Agent, or Firm* — Active Knowledge Ltd.

(57) ABSTRACT

Systems and methods for integrating a sequence of 2D-images of an object into a synthetic 3D-scene. A sequence of 2D-images of a target object is captured using a smart device such as a smartphone. The object is extracted from the image sequence, and converted into a corresponding sequence of flat-surfaced 3D-renderable objects that are placed in a synthetic 3D-scene. Movement and orientation of the smart device are captured and translated into corresponding viewing points in the 3D-scene, in which the viewing points are then used to 3D render the 3D-scene, together with the flat-surfaced 3D-renderable objects now embedded therewith, into a video sequence showing the target object as an integral part of the 3D-scene. Other effects such as lighting, shadowing and reflections are rendered in conjunction with the flat-surfaced 3D-renderable objects so as to further enhance an illusion that the target object is an integral part of the 3D-scene.

19 Claims, 12 Drawing Sheets

(51) Int. Cl.

| | |
|---|---|
| ***G06T 7/20*** | (2017.01) |
| ***G06T 13/00*** | (2011.01) |
| ***G06T 13/80*** | (2011.01) |
| ***G06T 15/00*** | (2011.01) |
| ***G06T 15/04*** | (2011.01) |
| ***G06T 19/00*** | (2011.01) |

(52) U.S. Cl.
CPC .............. *G06T 13/80* (2013.01); *G06T 15/00* (2013.01); *G06T 15/04* (2013.01); *G06T 19/006* (2013.01); *G06T 2219/2004* (2013.01); *G06T 2219/2016* (2013.01)

(58) Field of Classification Search
CPC . G06T 2219/2004; G06T 13/00; G06T 15/00; G06T 15/04; G06T 15/205; G06T 13/80; G06T 13/20
See application file for complete search history.

(56) References Cited

U.S. PATENT DOCUMENTS

| | | | | |
|---|---|---|---|---|
| 6,556,201 | B1 * | 4/2003 | Maehara | G06T 13/00 345/427 |
| 12,165,272 | B2 * | 12/2024 | Onuma | G06T 19/20 |
| 2019/0369722 | A1 * | 12/2019 | Lehtiniemi | G06F 3/0304 |

OTHER PUBLICATIONS

Rajan, Vivek, Satheesh Subramanian, Damin Keenan, Andrew Johnson, Daniel Sandin, and Thomas DeFanti. "A realistic video avatar system for networked virtual environments." PhD diss., University of Illinois at Chicago, 2002. (Year: 2002).*

* cited by examiner

INTEGRATING A SEQUENCE OF 2D IMAGES OF AN OBJECT INTO A SYNTHETIC 3D SCENE

CROSS REFERENCE TO RELATED APPLICATIONS

This application claims priority to U.S. Provisional Application No. 63/520,667, filed on Aug. 21, 2023.

FIELD OF THE INVENTION

This Application relates generally to the field of image and video generation.

SUMMARY

One embodiment is a system operative to integrate a sequence of two-dimensional (2D) images of a real three-dimensional (3D) object into a synthetic 3D scene, comprising: an image capturing sub-system configured to generate a sequence of images of a real object over a certain period and to extract at least one type of spatial information associated with the real object; a tracking sub-system configured to track movement and orientation of the image capturing sub-system during said certain period; a 3D rendering sub-system comprising a storage space operative to store a 3D model of a synthetic scene; and an image processing sub-system configured to generate, per each of the images in said sequence, a respective 3D-renderable object having a flat side that is shaped and texture-mapped according to the respective image of the real object, thereby creating a sequence of 3D-renderable objects that appear as the sequence of images of the real object when viewed from a viewpoint that is perpendicular to said flat side. In one embodiment, the system is configured to utilize the spatial information, together with said movement and orientation tracked, in order to: derive a sequence of virtual viewpoints that mimic said movement and orientation tracked; place and orient, in conjunction with said storage space, the sequence of 3D-renderable objects in the 3D model of the synthetic scene so as to cause the shaped and texture-mapped flat side of each of the 3D-renderable objects to face a respective one of the virtual viewpoints; and render a sequence of synthetic images, using the 3D rendering sub-system and in conjunction with the 3D model of the synthetic scene now including the sequence of 3D-renderable objects, from a set of rendering viewpoints that matches the sequence of virtual viewpoints mimicking said movement and orientation tracked; thereby creating a visual illusion that the real object is located in the synthetic scene.

One embodiment is a method for integrating a two-dimensional (2D) image of a real three-dimensional (3D) object into a synthetic 3D scene, comprising: detecting, in a first video stream, an object appearing therewith; generating a sequence of 3D-renderable flat surfaces, in which each of the surfaces has a contour that matches boundaries of the object as appearing in the video stream; texture mapping the 3D-renderable flat surfaces according to the appearance of the object in the video stream; placing and orienting the texture-mapped 3D-renderable flat surfaces in a 3D model of a synthetic scene; and 3D-rendering the 3D model of the synthetic scene that includes the texture-mapped 3D-renderable flat surfaces, thereby generating a second video showing the object as an integral part of the synthetic scene.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
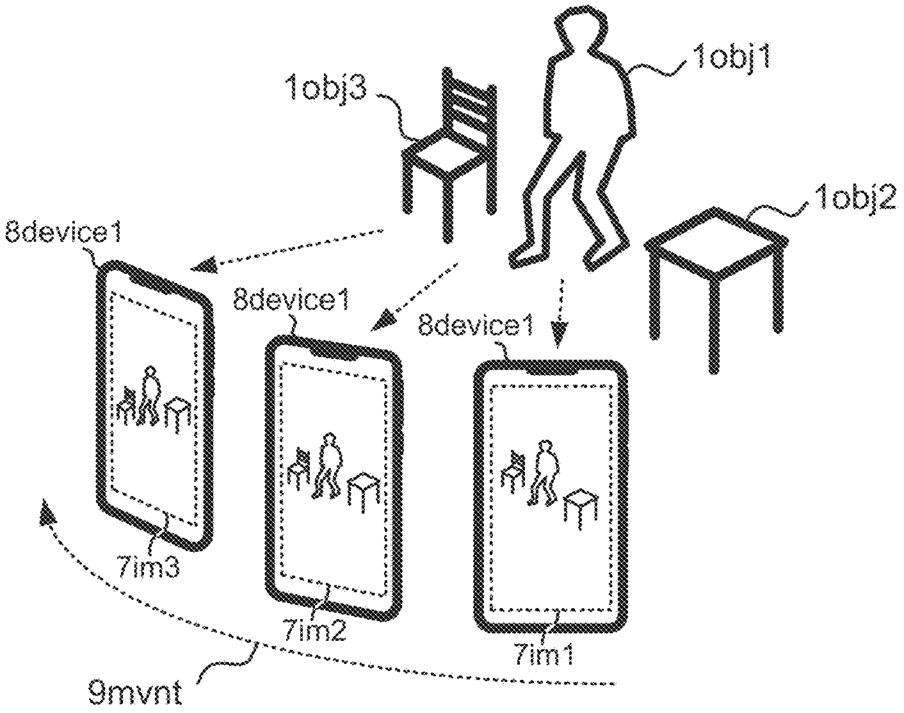
FIG. 1A illustrates one embodiment of a smartphone moving and changing orientation while capturing a sequence of images of various objects including a target object.

FIG. 1A illustrates one embodiment of a smartphone 8device1, or any other smart device comprising a camera, moving and changing orientation 9*mvnt* while capturing a sequence of images 7*im*1, 7*im*2, 7*im*3 of various objects 1*obj* including a target object 1*obj*1.

For example, a user walking through their living room, their smartphone in hand. As they move, their smartphone, 8device1, captures a sequence of images 7*im*1, 7*im*2, and 7*im*3. Each image captures a snapshot of the room from slightly different positions and angles, represented by the changing orientation 9*mvnt* of the phone. The room contains various objects 1*obj*, including furniture, decorations, and a person (1*obj*1) who is the primary subject of an image integration process to follow.

Figure 1B:
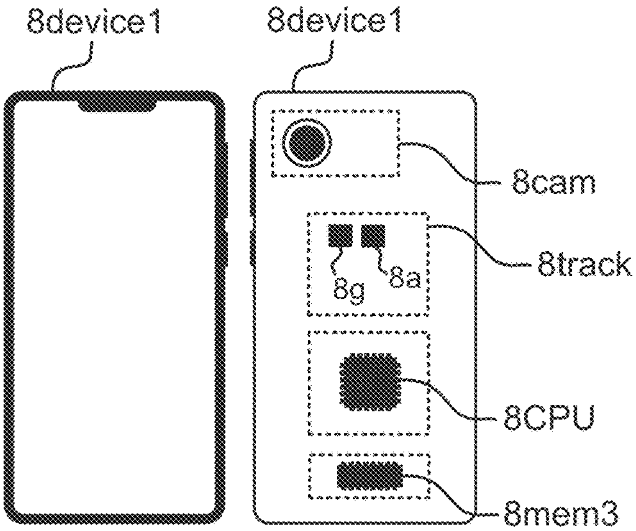
FIG. 1B illustrates one embodiment of the smartphone including a tracking sub-system operative to track said movement and changing of orientation.

FIG. 1B illustrates one embodiment of the smartphone 8device1 including a tracking sub-system 8track operative to track said movement and changing of orientation 9*mvnt*. A related camera 8*cam*, processor 8CPU and memory 8*mem*3 are also shown.

In one embodiment, the image capturing may be performed by the camera 8*cam*, while a sophisticated tracking sub-system 8track constantly monitors the phone's every move. This sub-system, which could be comprised of a gyroscope 8*g* and accelerometer 8*a*, precisely tracks the movement and orientation changes, 9*mvnt*, of the smartphone. This tracking information is crucial for understanding the camera's position and viewpoint in relation to the person, 1*obj*1 in each frame. The smartphone's processor 8CPU and memory 8*mem*3 work in conjunction with the tracking sub-system, ensuring efficient data processing and storage.

Figure 1C:
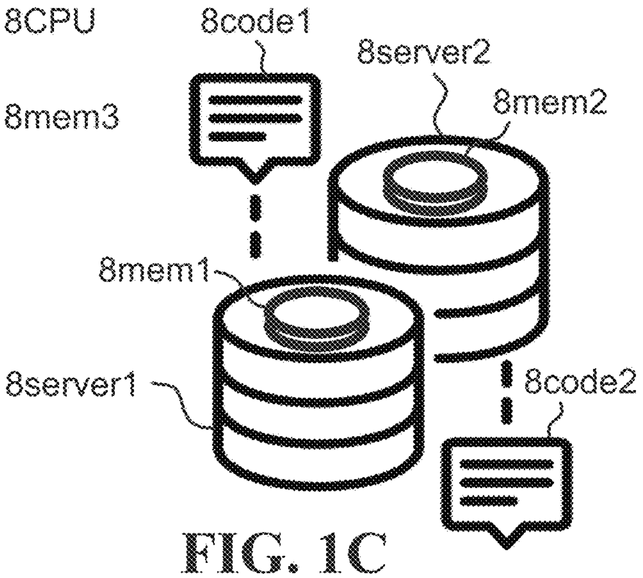
FIG. 1C illustrates one embodiment of a 3D rendering sub-system and an image processing sub-system with associated memory and code components.

FIG. 1C illustrates one embodiment of a 3D rendering sub-system 8server2 and an image processing sub-system 8server1 with respective memories 8*mem*2, 8*mem*1 and code components 8code2, 8code1.

In one embodiment, the captured images and tracking data are transmitted to a backend system. Here, an image processing sub-system, 8server1, with its memory 8*mem*1 and code components 8code1, including potentially sophisticated machine learning models, gets to work. It analyzes the images, expertly identifying and extracting the person, 1*obj*1, from the background. Meanwhile, a dedicated 3D rendering sub-system 8server2 stands ready with its memory 8*mem*2 and code components 8code2 to receive the extracted object data and seamlessly integrate it into the final, illusion-filled video. In one embodiment, the functions of the servers, or parts thereof, are performed internally within the smartphone or a similar device 8device1.

Figure 2:
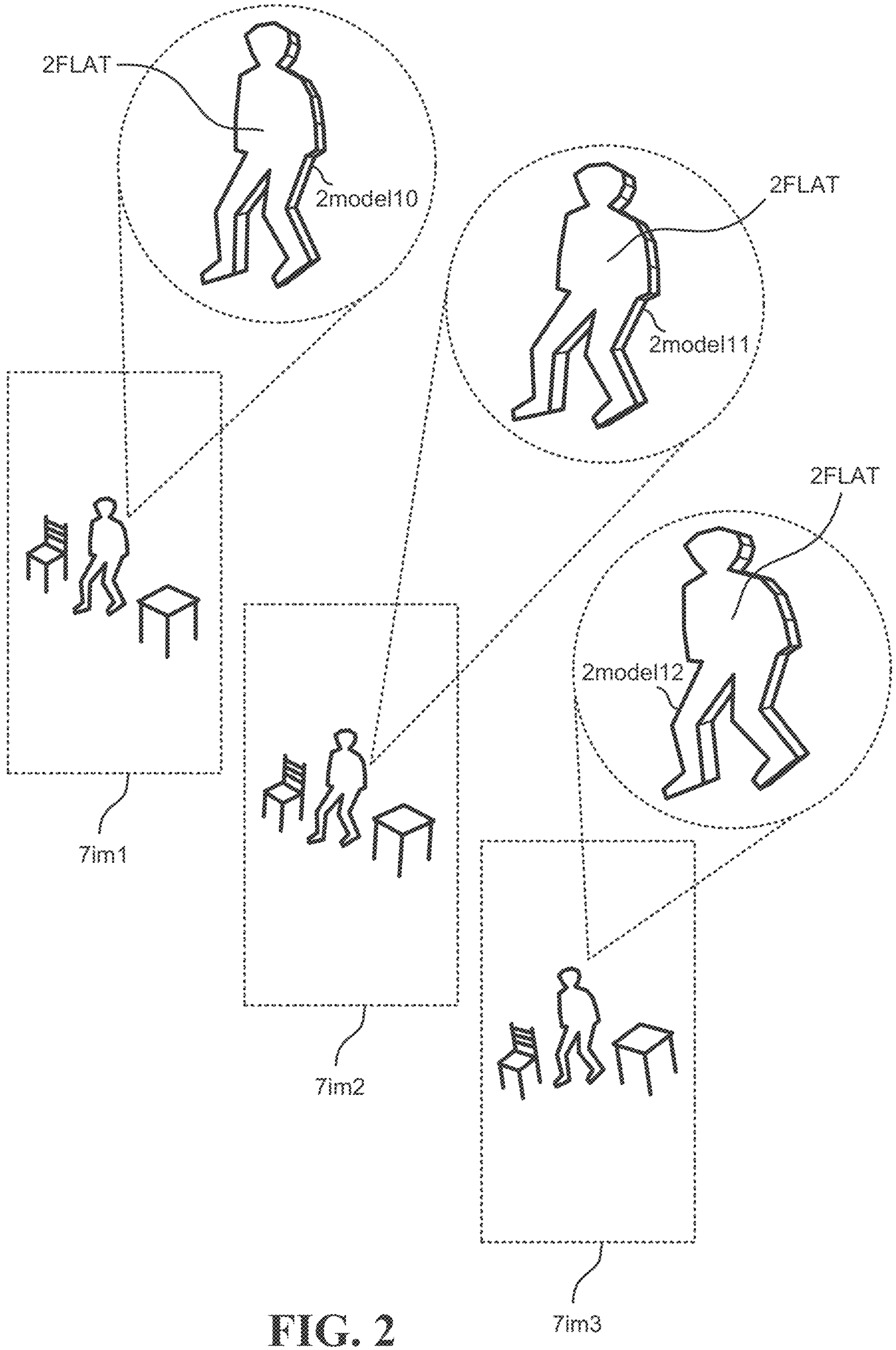
FIG. 2 illustrates one embodiment of a sequence of flat-surfaced 3D-renderable objects extracted respectively from the sequence of images and more specifically from the target object appearing in the sequence of images.

FIG. 2 illustrates one embodiment of a sequence of flat-surfaced 3D-renderable objects 2model10, 2model11, 2model12 extracted respectively from the sequence of images 7*im*1, 7*im*2, 7*im*3 and more specifically from the target object 1*obj*1 appearing in the sequence of images.

Focus now shifts to the person, 1*obj*1, as an example. From each captured image, 7*im*1, 7*im*2, 7*im*3, the image processing system generates a corresponding flat-surfaced 3D-renderable object: 2model10, 2model11, and 2model12. These objects, though simple in their flatness, are the building blocks of the illusion. Each object's flat side, denoted as 2FLAT, acts as a kind of a canvas, textured with the image of the person as they appeared in the corresponding frame.

Figure 3:
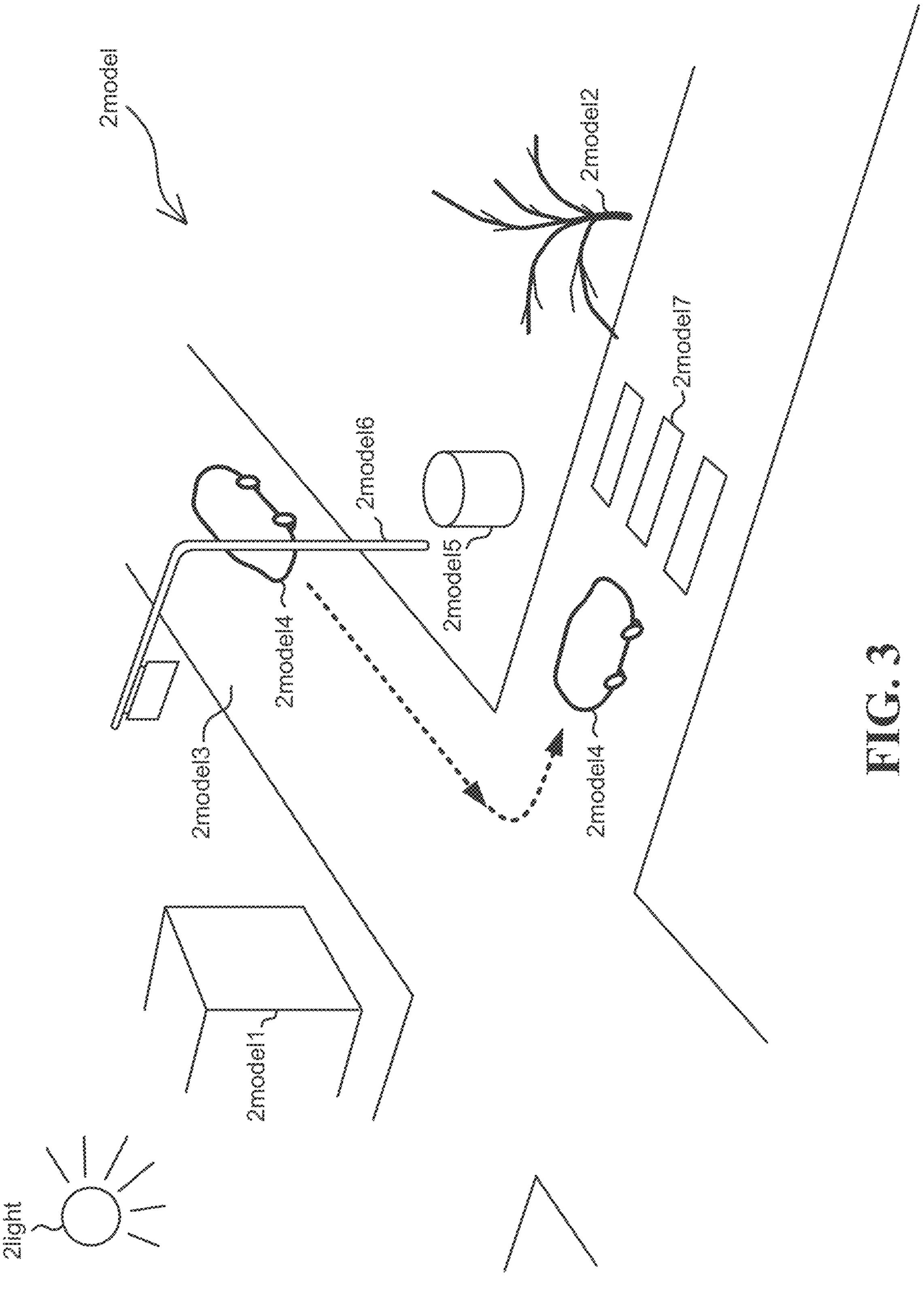
FIG. 3 illustrates one embodiment of a 3D model of a synthetic scene including various synthetic objects and various light sources.

FIG. 3 illustrates one embodiment of a 3D model 2model of a synthetic scene including various synthetic objects and various light sources 2light.

The stage is set. In one embodiment, a rich, detailed 3D model 2model of a synthetic scene is prepared. It could be a bustling cityscape, a tranquil forest, or any other virtual environment. This scene is populated with various synthetic objects, for example 2model1, 2model2, 2model3, 2model4, 2model5, 2model6, and 2model7, each contributing to the immersive experience. Carefully positioned light sources 2light bathe the scene in a realistic glow, casting subtle shadows and highlights that will further enhance the illusion to come. The person 1*obj*1 will be integrated into this scene.

Figure 4A:
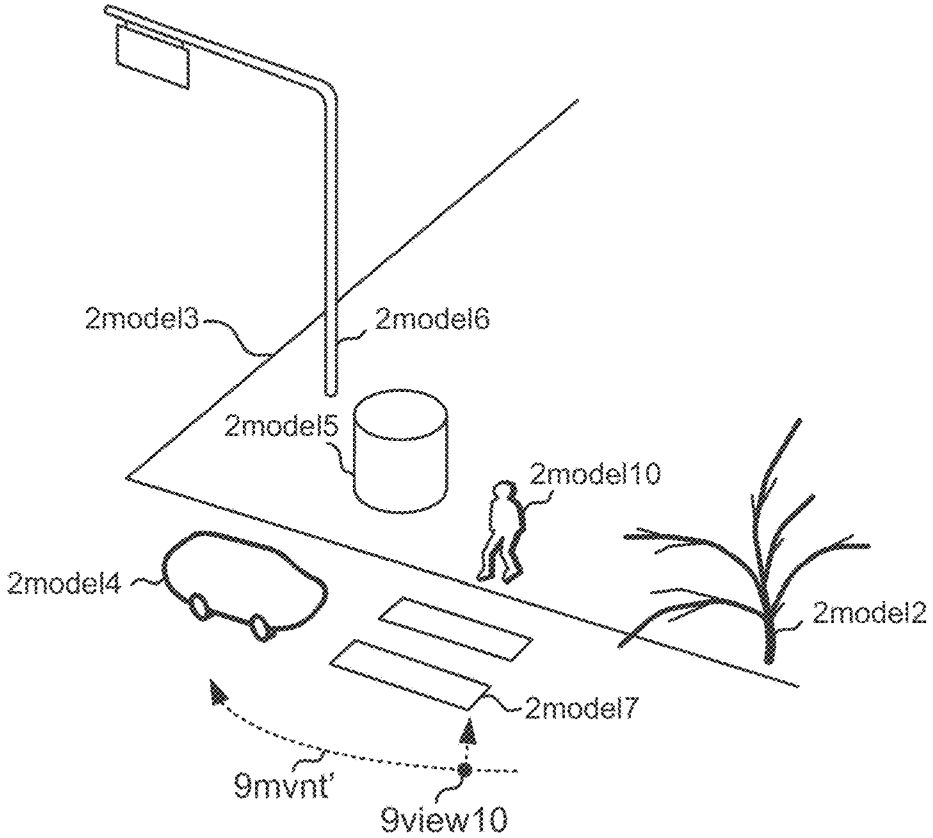
FIG. 4A illustrates one embodiment of placing one instance of the flat-surfaced 3D-renderable object in the 3D model of a synthetic scene and setting a respective viewing point corresponding to a point in the path of movement translated into a matching movement in the 3D model.

FIG. 4A illustrates one embodiment of placing one instance 2model10 of the flat-surfaced 3D-renderable object in the 3D model of a synthetic scene and setting a respective viewing point 9view10 corresponding to a point in the path of movement 9*mvnt* translated into a matching movement 9*mvnt*' in the 3D model 2model.

Figure 4B:
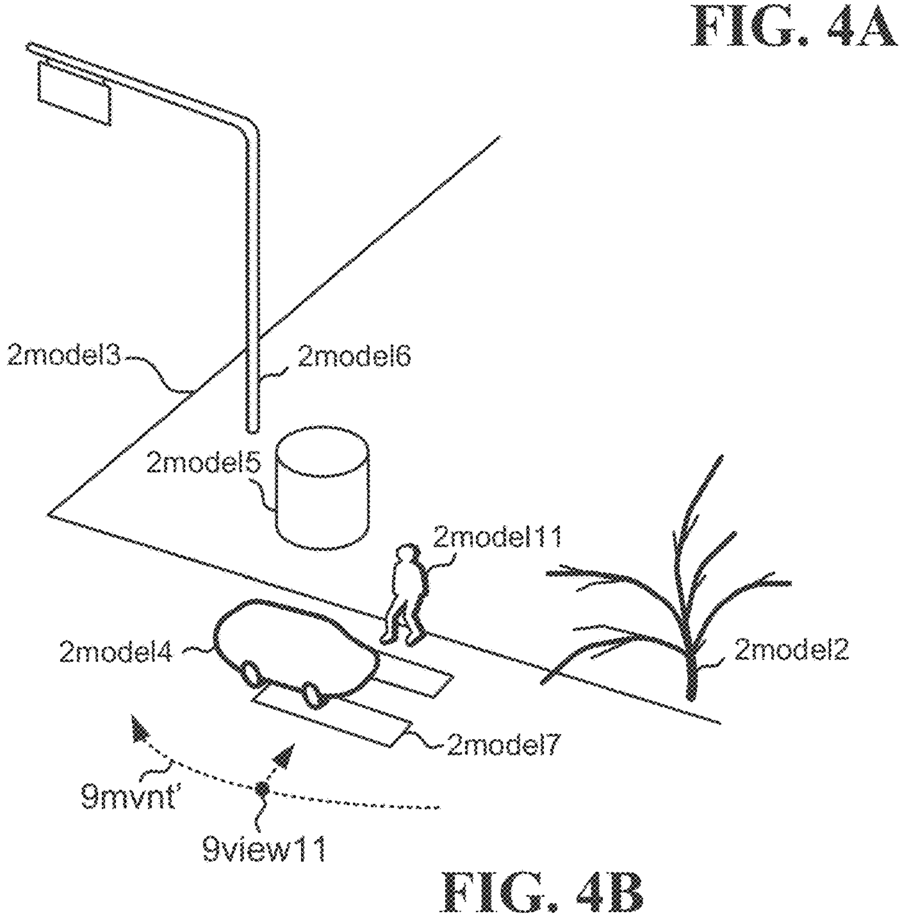
FIG. 4B illustrates one embodiment of placing another instance of the flat-surfaced 3D-renderable object in the 3D model of the synthetic scene and setting a respective different viewing point corresponding to next point in the path of movement translated into the matching movement in the 3D model.

FIG. 4B illustrates one embodiment of placing another instance 2model11 of the flat-surfaced 3D-renderable object in the 3D model of the synthetic scene and setting a respective different viewing point 9view11 corresponding to next point in the path of movement 9*mvnt* translated into the matching movement 9*mvnt*' in the 3D model 2model.

Figure 4C:
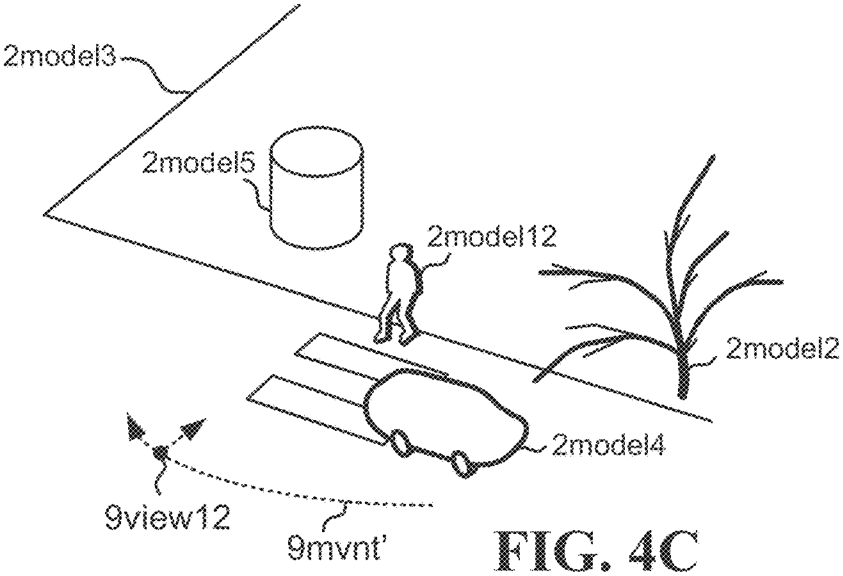
FIG. 4C illustrates one embodiment of placing yet another instance of the flat-surfaced 3D-renderable object in the 3D model of the synthetic scene and setting a respective next viewing point corresponding to following point in the path of movement translated into the matching movement in the 3D model.

FIG. 4C illustrates one embodiment of placing yet another instance 2model12 of the flat-surfaced 3D-renderable object in the 3D model of the synthetic scene and setting a respective next viewing point 9view 12 corresponding to following point in the path of movement 9*mvnt* translated into the matching movement 9*mvnt*' in the 3D model 2model.

Now, the magic begins. In one embodiment, each of the flat-surfaced 3D objects 2model10, 2model11, and 2model12, each depicting the person 1*obj*1 from a different viewpoint, is carefully placed and oriented within the synthetic scene 2model. Imagine these objects as virtual photographs of the person, strategically positioned to precisely match their real-world position and orientation as captured by the moving smartphone. Each flat-surfaced 3D object is associated with a corresponding viewpoint, 9view10, 9view11, 9view12, mimicking the smartphone's position and orientation 9*mvnt*, which has been translated into a matching movement within the 3D space, denoted as 9*mvnt'*.

Figure 5:
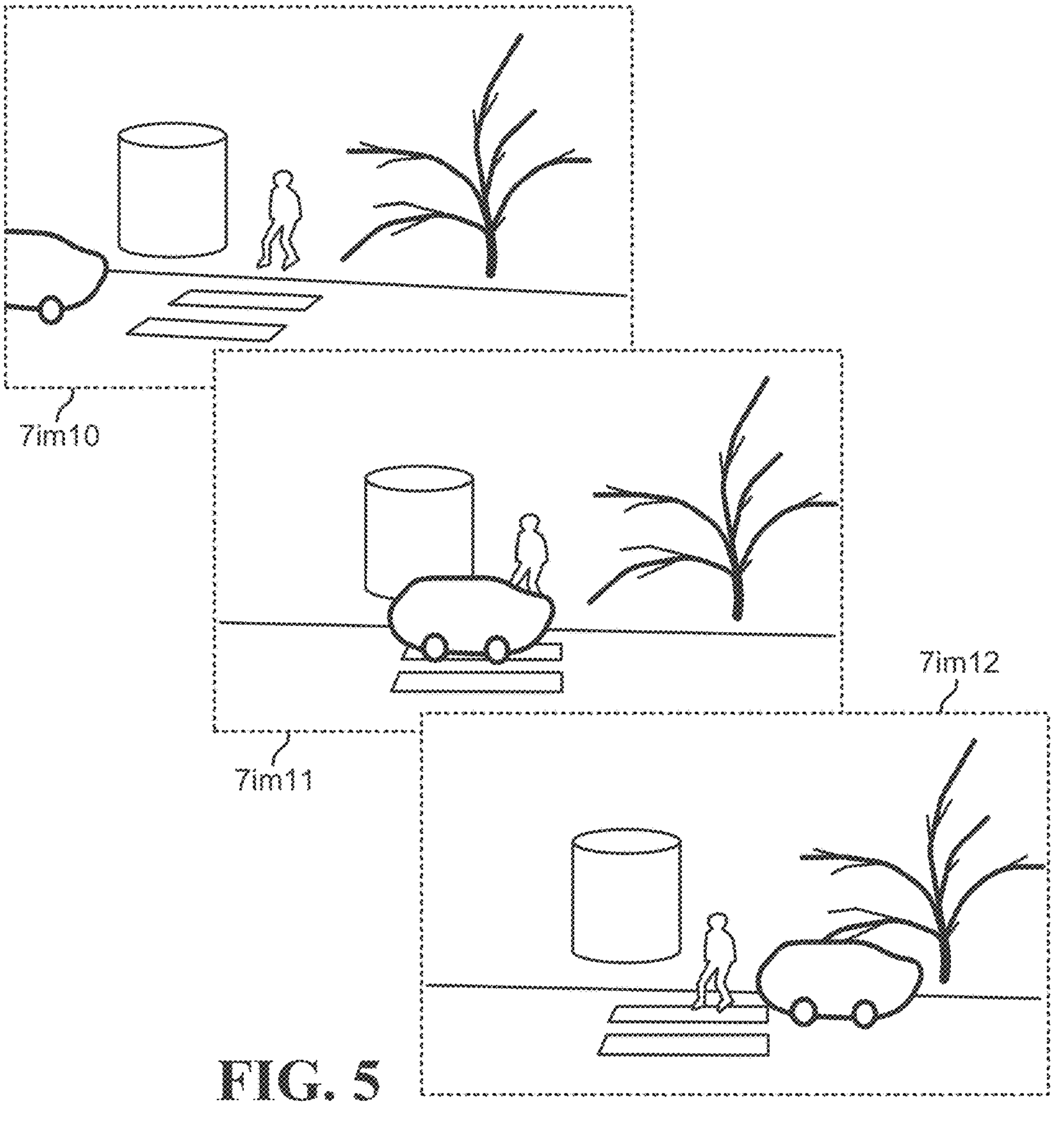
FIG. 5 illustrates one embodiment of a sequence of synthetic images that are 3D-rendered from the 3D model of the synthetic scene comprising the flat-surfaced 3D-renderable objects and via the different viewing points along the translated path of movement so as to create an illusion that the target object is an integral part of the synthetic scene.

FIG. 5 illustrates one embodiment of a sequence of synthetic images 7*im*10, 7*im*11, 7*im*12 that are 3D-rendered from the 3D model of the synthetic scene 2model comprising the flat-surfaced 3D-renderable objects 2model10, 2model11, 2model12 and via the different viewing points 9view10, 9view11, 9view12 along the translated path of movement 9*mvnt*' so as to create an illusion that the target object 1*obj*1 is an integral part of the synthetic scene.

The scene is set, the virtual camera in position. In one embodiment, the 3D rendering system renders a sequence of synthetic images 7*im*10, 7*im*11, and 7*im*12 from the prepared 3D model. Each image is rendered from the viewpoint associated with its corresponding flat-surfaced object, following the translated path of movement 9*mvnt*'. When these images are played in sequence, a captivating illusion emerges: the person appears seamlessly integrated into the synthetic scene, as if they had always been there.

Figure 6A:
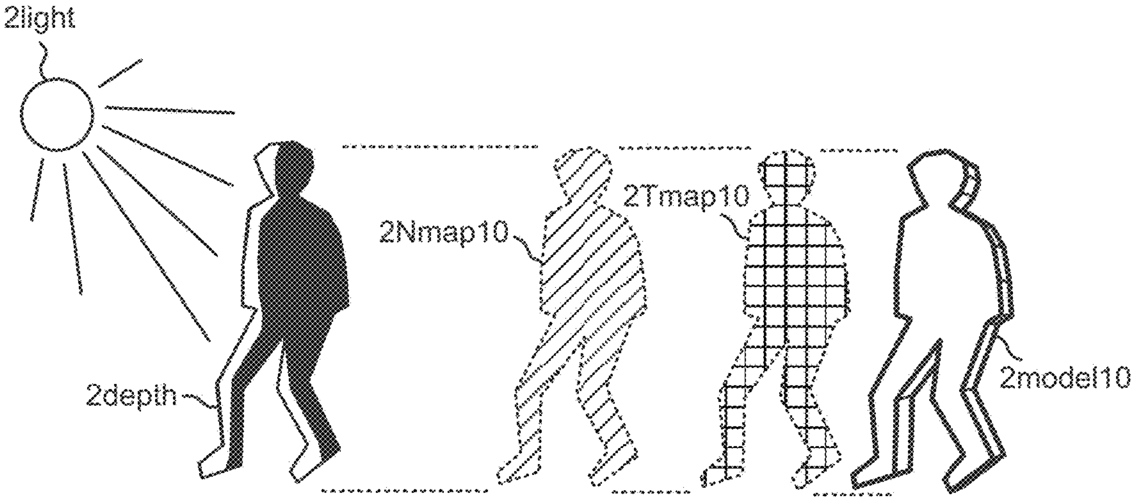
FIG. 6A illustrates one embodiment of adding light effects to the flat-surfaced 3D-renderable object using synthetic light sources in the 3D model of the synthetic scene so as to strengthen said illusion that the target object is an integral part of the synthetic scene.

FIG. 6A illustrates one embodiment of adding light effects 2depth to the flat-surfaced 3D-renderable object 2model10 using synthetic light sources 2light in the 3D model of the synthetic scene 2model so as to strengthen said illusion that the target object 1*obj*1 is an integral part of the synthetic scene. A related texture map 2Tmap10 and a normals map 2Nmap10 are also shown.

Figure 6B:
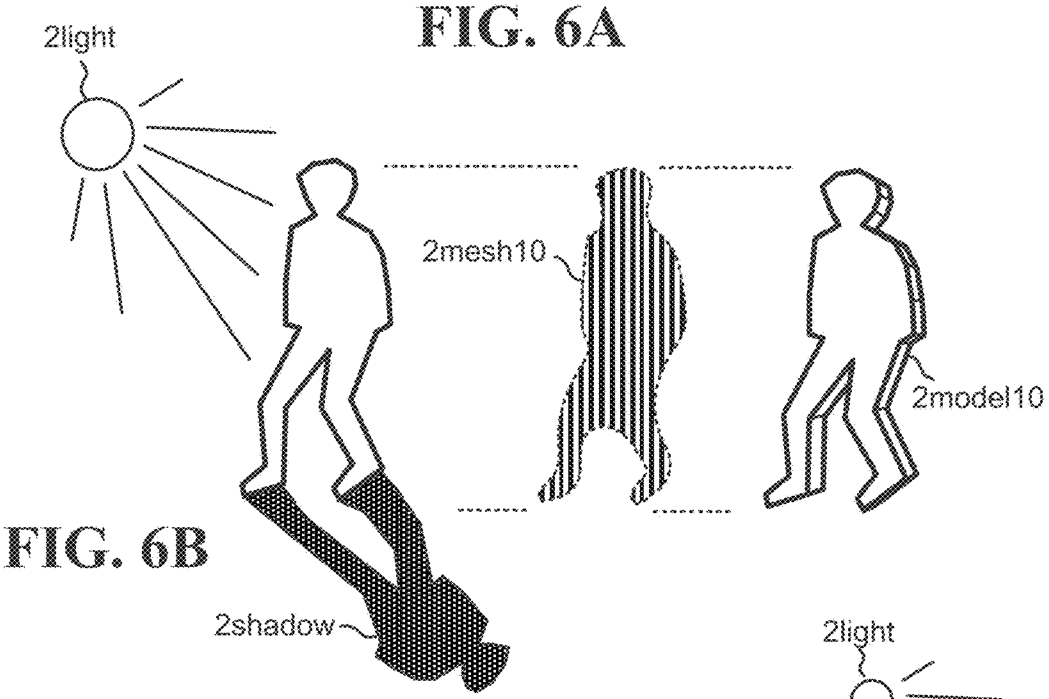
FIG. 6B illustrates one embodiment of adding shadow effects to the flat-surfaced 3D-renderable object using synthetic light sources in the 3D model of the synthetic scene so as to strengthen even more said illusion that the target object is an integral part of the synthetic scene.

FIG. 6B illustrates one embodiment of adding shadow effects 2shadow to the flat-surfaced 3D-renderable object 2model10 using synthetic light sources 2light in the 3D model of the synthetic scene 2model so as to strengthen even more said illusion that the target object 1*obj*1 is an integral part of the synthetic scene. A related 3D mesh 2mesh10 is also shown.

Figure 6C:
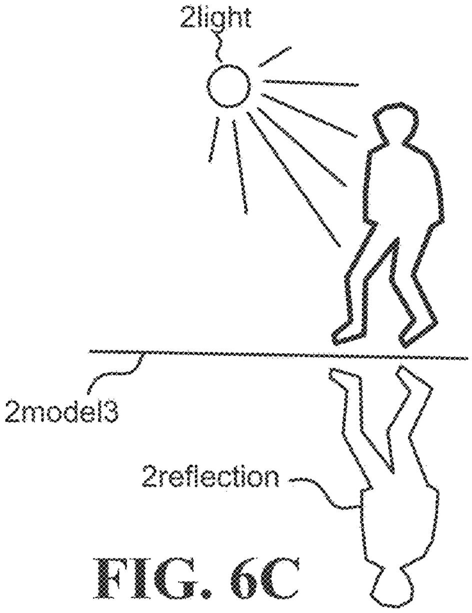
FIG. 6C illustrates one embodiment of adding reflection effects to the flat-surfaced 3D-renderable object using synthetic light sources and reflective surfaces in the 3D model of the synthetic scene so as to strengthen yet again said illusion that the target object is an integral part of the synthetic scene.

FIG. 6C illustrates one embodiment of adding reflection effects 2reflection to the flat-surfaced 3D-renderable object 2model10 using synthetic light sources 2light and reflective surfaces 2model3 in the 3D model of the synthetic scene 2model so as to strengthen yet again said illusion that the target object 1*obj*1 is an integral part of the synthetic scene.

To further enhance the realism and solidify the illusion, in one embodiment, the rendering system employs advanced techniques. The texture map 2Tmap10 applied to the flat surfaces is complemented by a normals map 2Nmap10, defining the surface's orientation and enabling realistic light interaction. This creates the illusion of depth 2depth, making the flat surface of the person appear convincingly three-dimensional. Additionally, the system can utilize a 3D mesh 2mesh10 to calculate and render realistic shadows 2shadow cast by the person onto the surrounding environment. Reflections 2reflection of the person on other surfaces in the scene, like a reflective surface 2model3, further add to the immersive visual experience, making the integration nearly indistinguishable from reality.

Exemplary Scenario #1: Integrating a Parked Sports Car into a Racing Stadium:

Capture: A user walks by a parked sports car 1*obj*1 on a regular city street and decides to capture its sleek design. They take a few steps around the car, capturing a sequence of images 7*im*1, 7*im*2, 7*im*3 with their smartphone 8device1. Other objects 1*obj* in the scene might include sidewalks, streetlights, and nearby buildings. The smartphone's tracking sub-system 8track diligently records the user's movement and the phone's orientation changes 9*mvnt* using its internal gyroscope 8*g* and accelerometer 8*a*.

Processing: The captured images and tracking data are transmitted to the image processing server 8server1. Sophisticated algorithms (8code1), potentially powered by machine learning, identify and extract the sports car 1*obj*1 from each image, separating it from the background. Simultaneously, the 3D rendering server 8server2 loads a vibrant 3D model 2model of a famous racing stadium, packed with grandstands, a bustling pit lane, and bathed in the bright lights (2light) typical of such a venue.

3D Object Generation: For each captured image 7*im*1, 7*im*2, 7*im*3, a corresponding flat-surfaced 3D object (2model10, 2model11, 2model12) is generated. The flat side 2FLAT of each object is meticulously textured with the image of the sports car, preserving its appearance from that specific angle.

Integration and Rendering: Now, the magic of illusion begins. Even though the real sports car is stationary, the tracked movement 9*mvnt* of the smartphone allows for a dynamic integration. The flat-surfaced objects are strategically placed within the 3D racing stadium model 2model, positioned as if the car were parked in the pit lane, ready for the race. The user's original movements 9*mvnt* are translated into matching movements 9*mvnt*' within the virtual stadium, and virtual viewpoints 9view10, 9view11, 9view12 are set accordingly. The 3D rendering system then produces a sequence of synthetic images 7*im*10, 7*im*11, 7*im*12 from these viewpoints, creating an animation of the viewer "walking around" the car inside the stadium.

Enhancements: To amplify the realism, additional visual effects are employed. A normals map 2Nmap10 is applied to the flat-surfaced car objects, allowing them to interact convincingly with the stadium lights and create an illusion of depth 2depth. Shadows 2shadow of the car are cast on the pit lane floor, and reflections 2reflection gleam off its polished surface, mimicking the ambiance of the racing environment.

Result: The final rendered video transports the user and the sports car from the mundane city street to the heart of a thrilling racing stadium. The car, though originally stationary, appears as a natural part of the scene, seamlessly integrated into this exciting new environment thanks to the clever combination of image capture, tracking, and 3D rendering techniques. The illusion is complete, blurring the lines between reality and the virtual world.

Exemplary Scenario #2: Placing a Person in a Historical Setting:

Capture: Imagine a tourist visiting a historical landmark, capturing a friend 1*obj*1 posing in front of an ancient ruin. The smartphone 8device1 captures a sequence of images 7*im*1, 7*im*2, 7*im*3, while the tracking sub-system 8track accurately records the phone's movements 9*mvnt*.

Processing: The images are processed locally in the smartphone, where the person 1*obj*1 is extracted, aided by machine learning models 8code1 that may be utilized by the smartphone. The rendering server 8server2 prepares a 3D model 2model of the historical site, including detailed reconstructions of buildings and structures, along with accurate lighting 2light that simulates the time of day.

3D Object Generation: Flat-surfaced 3D objects 2model10, 2model11, 2model12 are created from the extracted images of the person, each textured with the corresponding pose from 7*im*1, 7*im*2, 7*im*3 on its flat side 2FLAT.

Integration and Rendering: Guided by the translated movement 9*mvnt*' of the smartphone, the flat-surfaced objects are placed and oriented within the 3D model 2model, precisely matching the person's position and pose across the captured images. The final rendered video 7*im*10, 7*im*11, 7*im*12 is created from virtual viewpoints 9view10, 9view11, 9view12 that correspond to the user's original movements.

Result: The final video shows the tourist's friend seamlessly integrated into the historical setting. They appear as if they were truly present at the landmark, convincingly blended into the scene thanks to the accurate tracking and 3D rendering process.

Exemplary Scenario #3: Adding a Virtual Coffee Cup to a Tabletop Scene

Capture: A user sets a coffee cup 1*obj*1 on their desk and captures a few images 7*im*1, 7*im*2, 7*im*3 with their smartphone 8device1, focusing on the cup as the main subject. The tracking sub-system 8track records the phone's movements 9*mvnt*.

Processing: The image processing server 8server1 isolates the coffee cup 1*obj*1 from the background clutter 1*obj* (papers, pens, etc.) using machine learning algorithms 8code1. The rendering server 8server2 loads a simple 3D model 2model of a wooden tabletop lit by a warm lamp (2light).

3D Object Generation: Flat-surfaced 3D objects 2model10, 2model11, 2model12 are generated, textured with the captured images of the coffee cup on their 2FLAT sides.

Integration and Rendering: The coffee cup objects are positioned on the tabletop within the 3D scene 2model, matching the real cup's placement across the images. The final video is rendered from viewpoints 9view10, 9view11, 9view12 that mimic the smartphone's original movement, creating a realistic animation of the cup being set down.

Result: The final rendered video displays a simple yet convincing illusion. The real coffee cup appears to seamlessly materialize on the virtual tabletop, demonstrating how the invention can be used to integrate even everyday objects into synthetic environments for various creative or illustrative purposes.

One embodiment is a system operative to integrate a sequence of two-dimensional (2D) images of a real three-dimensional (3D) object into a synthetic 3D scene, comprising: an image capturing sub-system 8*cam* (FIG. 1B) configured to generate a sequence of images 7*im*1, 7*im*2. 7*im*3 (FIG. 1B) of a real object 1*obj*1 (FIG. 1A) over a certain period and to extract at least one type of spatial information associated with the real object; a tracking sub-system 8track (FIG. 1B) configured to track movement and orientation 9*mvnt* (FIG. 1A) of the image capturing sub-system 8*cam* during said certain period; a 3D rendering sub-system 8server2 (FIG. 1C) comprising a storage space 8*mem*2 operative to store a 3D model 2model (FIG. 3) of a synthetic scene; and an image processing sub-system 8server1 (FIG. 1C) configured to generate, per each of the images 7*im*1, 7*im*2. 7*im*3 in said sequence, a respective 3D-renderable object 2model10, 2model11, 2model12 (FIG. 2) having a flat side 2FLAT that is shaped and texture-mapped 2Tmap10 (FIG. 6A) according to the respective image 7*im*1, 7*im*2. 7*im*3 of the real object 1*obj*1, thereby creating a sequence of 3D-renderable objects 2model10, 2model11, 2model12 that appear as the sequence of images of the real object 1*obj*1 when viewed from a viewpoint that is perpendicular to said flat side 2FLAT.

In one embodiment, the system is configured to utilize the spatial information, together with said movement and orientation tracked 9*mvnt*, in order to: derive a sequence of virtual viewpoints 9view10, 9view11, 9view12 (FIG. 4A, FIG. 4B, FIG. 4C) that mimic 9*mvnt*' (FIG. 4A, FIG. 4B, FIG. 4C) said movement and orientation tracked 9*mvnt*; place and orient, in conjunction with said storage space 8*mem*2, the sequence of 3D-renderable objects 2model10, 2model11, 2model12 (FIG. 4A, FIG. 4B, FIG. 4C) in the 3D model 2model of the synthetic scene so as to cause the shaped and texture-mapped flat side 2FLAT of each of the 3D-renderable objects 2model10, 2model11, 2model12 to face a respective one of the virtual viewpoints 9view10, 9view11, 9view12; and render a sequence of synthetic images 7*im*10, 7*im*11, 7*im*12 (FIG. 5), using the 3D rendering sub-system 8server2 and in conjunction with the 3D model 2model of the synthetic scene now including the sequence of 3D-renderable objects 2model10, 2model11, 2model12, from a set of rendering viewpoints that matches the sequence of virtual viewpoints 9view10, 9view11, 9view12 mimicking 9*mvnt*' said movement and orientation tracked 9*mvnt*; thereby creating a visual illusion that the real object 1*obj*1 is located in the synthetic scene.

In one embodiment, said 3D-renderable object 2model10, 2model11, 2model12 is a two-dimensional (2D) surface constituting a 2D sprite of the real object 1*obj*1.

In one embodiment, the image processing sub-system 8server1 is further configured to generate and place a 2D normals map 2Nmap10 (FIG. 6A) upon the 2D sprite 2model10, 2model11, 2model12, in which said 2D normals map is operative to inform the 3D rendering sub-system 8server2 regarding which 3D direction each point in the texture map 2Tmap10 of the 2D sprite 2model10, 2model11, 2model12 is facing; and the 3D rendering sub-system 8server2 is further configured to use said 2D normals map 2Tmap10, in conjunction with said rendering of said sequence of synthetic images 7*im*10, 7*im*11, 7*im*12, to generate an illusion of depth using lighting effects 2depth (FIG. 6A).

In one embodiment, the image processing sub-system 8server1 comprises a respective storage space 8*mem*1; and said 2D normals map 2Nmap10 generation is done in the image processing sub-system 8server1 using a machine learning model 8code1 that is stored in said respective storage space 8*mem*1 and that is operative to receive the texture map 2Tmap10 of the 2D sprite 2model10, 2model11, 2model12 and extrapolate said normals 2Nmap10 maps from said texture map received.

In one embodiment, said lighting effects are associated with lighting sources 2light (FIG. 3, FIG. 6A) embedded in the 3D model 2model of the synthetic scene, in which said lighting sources are operative to interact with the normals maps 2Nmap10 of the 2D sprite 2model10, 2model11, 2model12, in conjunction with said rendering of said sequence of synthetic images 7*im*10, 7*im*11, 7*im*12, to facilitate said illusion of depth 2depth and to enhance said visual illusion that the real object 1*obj*1 is located in the synthetic scene.

In one embodiment, the image processing sub-system 8server1 is further configured to generate and place a shadow mesh 2mesh10 (FIG. 6B) matching an expected 3D extrapolation of the 2D sprite 2model10, 2model11, 2model12, in which said shadow mesh is operative to inform the 3D rendering sub-system 8server2 regarding a shadow that the 2D sprite would have casted as a 3D body; and the 3D rendering sub-system 8server2 is further configured to use said shadow mesh 2mesh10, in conjunction with said rendering of said sequence of synthetic images 7*im*10, 7*im*11, 7*im*12, to generate an illusion of a shadow 2shadow (FIG. 6B) casted by the real object 1*obj*1.

In one embodiment, the image processing sub-system 8server1 comprises a respective storage space 8*mem*1; and said 3D extrapolation is done in the image processing sub-system 8server1 using a machine learning model 8code1 that is stored in said respective storage space and that is operative to receive at least the texture map 2Tmap10 of the 2D sprite 2model10, 2model11, 2model12 and extrapolate said shadow mesh 2mesh10 from said texture map received.

In one embodiment, said 3D model 2model of the synthetic scene comprises various other 3D elements, in which at least one of the other 3D elements 2model3 is a reflective surface such as a body of water and/or a flat polished surface such as a wet road, and in which an image of the 2D sprite 2model10, 2model11, 2model12 is reflected 2reflection (FIG. 6C) from the reflective surface 2model3 in conjunction with said rendering of said sequence of synthetic images 7*im*10, 7*im*11, 7*im*12 and further in conjunction with lighting sources 2light embedded in the 3D model 2model of the synthetic scene, thereby enhancing said visual illusion that the real object 1*obj*1 is located in the synthetic scene.

In one embodiment, said 3D-renderable object 2model10, 2model11, 2model12 is a 3D object having a flat side 2FLAT.

In one embodiment, the image processing sub-system 8server1 comprises a respective storage space 8*mem*1; and as part of said generation of the 3D-renderable objects 2model10, 2model11, 2model12 having the flat sides 2FLAT that are shaped and texture-mapped 2Tmap10 according to the images 7*im*1, 7*im*2. 7*im*3 of the real object 1*obj*1, the image processing sub-system is further configured to: detect boundaries of the object 1*obj*1 in the images 7*im*1, 7*im*2. 7*im*3 using a machine learning model 8code1 stored in said respective storage space 8*mem*1; and remove, in conjunction with said boundaries detected, a background 1*obj*2, 1*obj*3 (FIG. 1A) appearing in the images 7*im*1, 7*im*2. 7*im*3, thereby being left with a representation of the object itself 1*obj*1 that is operative to constitute the flat sides 2FLAT that are shaped and texture-mapped 2Tmap10 according to the object itself 1*obj*1.

In one embodiment, said 3D model 2model of the synthetic scene comprises various other 3D items 2model4, in which at least one of the other 3D items 2model4 partially blocks, in a visual sense, at least some of the 3D-renderable objects 2model11 (FIG. 4B) in the 3D model 2model when viewed from said virtual viewpoints 9view11, and in which such partial blockage is inherently translated, during said rendering sequence, to synthetic images 7*im*11 of the 3D-renderable objects 2model11 that are partially obscured by said at least one item 2model4.

In one embodiment, said at least one type of spatial information associated with the real object 1*obj*1 comprises at least one of: (i) distance from the image capturing sub-system 8*cam* and (ii) height above ground.

In one embodiment, said real object 1*obj*1 comprises at least one of: (i) a person, (ii) a group of persons, (iii) animals, and (iv) inanimate objects such as furniture and vehicles.

In one embodiment, said image capturing sub-system 8*cam* comprises a camera of a smartphone 8device1 (FIG. 1A, FIG. 1B).

In one embodiment, said tracking sub-system 8track comprises at least part of an inertial positioning system integrated in the smartphone 8device1.

In one embodiment, said inertial positioning system comprises at least one of: (i) at least one accelerometer 8*a* (FIG. 1B) and (ii) a gyroscope 8*g* (FIG. 1B).

In one embodiment, said inertial positioning system comprises at least a visual simultaneous localization and mapping (VSLAM) sub-system 8CPU+8*mem*3+8track (FIG. 1B).

In one embodiment, said image capturing sub-system 8*cam* further comprises a light detection and ranging (LIDAR) sensor integrated in the smartphone 8device1 and operative to facilitated said extraction of the at least one type of spatial information.

In one embodiment, said 3D rendering sub-system 8server2 is a rendering server communicatively connected with said smartphone 8device1.

In one embodiment, said image processing sub-system 8server1 is an image processing server communicatively connected with said smartphone 8device1.

In one embodiment, said image processing sub-system 8server1 is a part of a processing unit 8CPU integrated in the smartphone 8device1 and comprising at least one of: (i) a central processing unit (CPU), (ii) a graphics processing unit (GPU), and (iii) an AI processing engine.

In one embodiment, the tracking sub-system comprises a visual simultaneous localization and mapping (VSLAM) server 8server1 communicatively connected with said smartphone 8device1.

Figure 7:
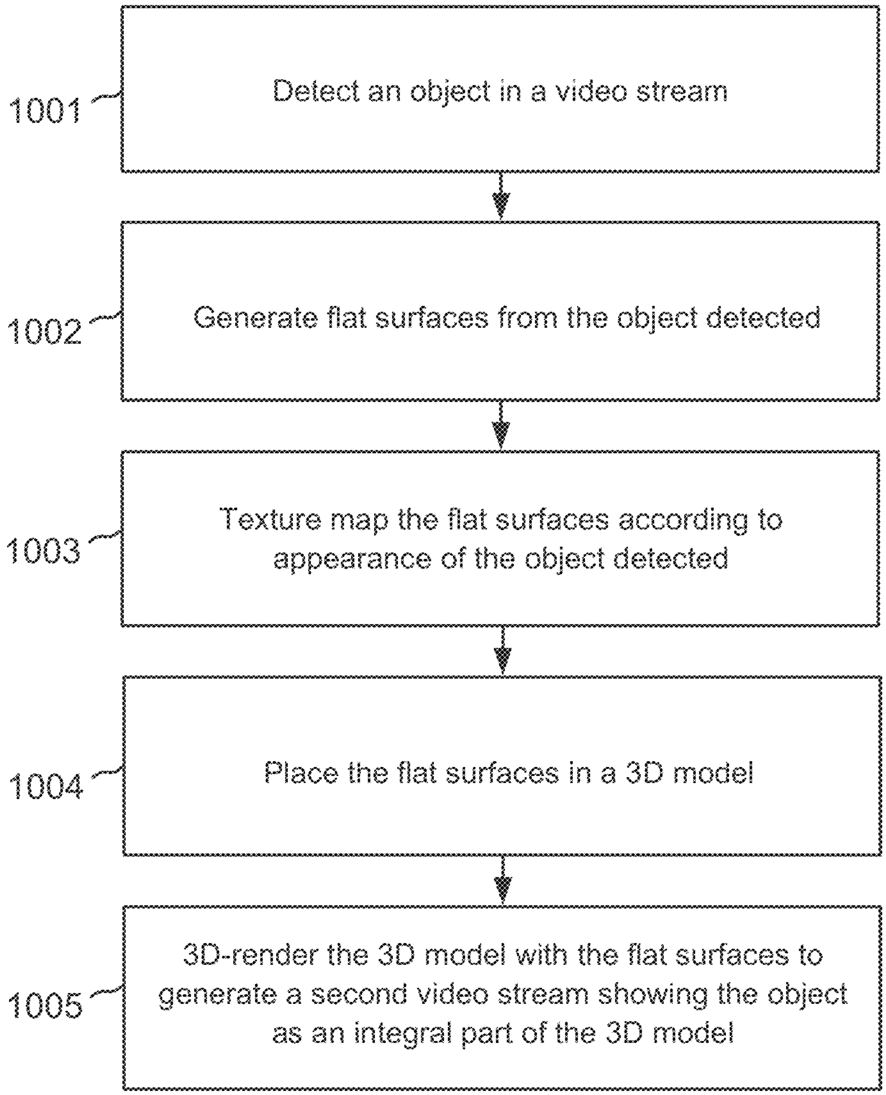
FIG. 7 illustrates one embodiment of a method for integrating a 2D image of a real 3D object into a synthetic 3D scene.

FIG. 7 illustrates one embodiment of a method for integrating a two-dimensional (2D) image of a real three-dimensional (3D) object into a synthetic 3D scene. The method includes: in step 1001, detecting, in a first video stream 7*im*1, 7*im*2, 7*im*3, an object 1*obj*1 appearing therewith. In step 1002, generating a sequence of 3D-renderable flat surfaces 2model10, 2model11, 2model12, in which each of the surfaces has a contour that matches boundaries of the object 1*obj*1 as appearing in the video stream 7*im*1, 7*im*2, 7*im*3. In step 1003, texture mapping 2Tmap10 the 3D-renderable flat surfaces 2model10, 2model11, 2model12 according to the appearance of the object 1*obj*1 in the video stream 7*im*1, 7*im*2, 7*im*3. In step 1004, placing and orienting the texture-mapped 3D-renderable flat surfaces 2model10, 2model11, 2model12 in a 3D model 2model of a synthetic scene. In step 1005, 3D-rendering the 3D model 2model of the synthetic scene that includes the texture-mapped 3D-renderable flat surfaces 2model10, 2model11, 2model12, thereby generating a second video 7*im*10, 7*im*11, 7*im*12 showing the object 1*obj*1 as an integral part of the synthetic scene.

Understanding "Flat Surface" in the Context of the Invention.

The term "flat surface," as used in this invention, refers to the primary 3D-renderable object that represents the real-world object within the synthetic scene. While the term "flat" might initially suggest a perfectly planar surface, it encompasses a broader concept in this context.

Here's a breakdown of what "flat surface" signifies in this invention:

Essentially 2D: Despite being rendered in a 3D environment, the core object remains fundamentally two-dimensional. It's like a sheet of paper or a canvas, possessing width and height but minimal or no depth. It primarily serves as a display surface for the texture mapped from the captured image of the real-world object.

Degrees of Flatness: The "flatness" can vary:

Completely Flat (Canvas-like): The surface can be perfectly planar, much like a canvas onto which an image is projected. This works well for all 3D objects.

Slightly Bent (Topography-Aware): To enhance realism, the surface can be slightly bent or curved to reflect the basic topography of the captured object. This means it can follow the general contours of the object without being a fully realized 3D model. For instance:

Person: The flat surface representing a person might be slightly bent to follow the curvature of their body, but it wouldn't have the full volume and detail of a complete 3D human model. It's still essentially a "flat" representation with subtle adjustments.

Car: The flat surface representing a car could be gently curved to follow the roofline and side panels, capturing the basic shape without including the full depth of the vehicle's interior or engine.

Distinction from 3D Objects: The key distinction is that these "flat surfaces" are not intended to be complete, volumetric 3D models of the objects. They don't have the internal structure, details, or complexity of a true 3D object. Instead, they are cleverly crafted 2D representations projected into the 3D space, optimized for creating a convincing illusion when viewed from specific angles and combined with tracking data.

By using these simplified "flat surfaces" instead of complex 3D models, the invention achieves a balance between realism and computational efficiency. The illusion of integration is achieved by leveraging accurate tracking data and rendering the surfaces from specific viewpoints, making the flat representations appear convincingly three-dimensional to the viewer.

It is important to clarify that the term "flat surface," as used in this invention, refers primarily to the visible side of the 3D-renderable object, the side that faces the virtual camera during the rendering process. The opposite side, or "back" of the flat surface, is by definition hidden from view in the final rendered video and therefore can be of any arbitrary shape without affecting the visual result.

Tracking with Gyroscopes and Accelerometers: General Principle: Gyroscopes and accelerometers are inertial sensors commonly used for motion tracking. They work in tandem to provide information about an object's orientation and movement in space. Gyroscope: Measures angular velocity, which is the rate of rotation around an axis. It helps determine how the object is turning or tilting. Accelerometer: Measures linear acceleration, which is the rate of change in velocity in a straight line. It detects movement in any direction, including gravity.

Tracking Applications: By combining data from both sensors, we can: Determine Orientation: The gyroscope provides data on rotations, allowing us to calculate the object's current tilt and heading. Estimate Position: Integrating acceleration data over time can provide an estimate of the object's displacement (change in position).

Limitations: Drift: Gyroscope readings tend to drift over time due to small errors accumulating. Integration Error: Errors in acceleration readings can compound during integration, leading to inaccurate position estimates, especially over longer durations.

Specific Application in the Invention: In this invention, the gyroscope and accelerometer in the smartphone 8track (FIG. 1B) track the device's movement (9*mvnt*—FIG. 1A) as the user captures images of the target object. This tracking data is crucial for: Determining Camera Pose: By knowing the smartphone's orientation and position, we can accurately determine the camera's viewpoint for each captured image. Positioning 3D Objects: This tracking information is used to precisely position and orient the flat-surfaced 3D objects (2model10, 2model11, 2model12—FIG. 2) within the synthetic scene (2model—FIG. 3). Creating Viewpoints for Rendering: The tracked camera movement is translated into a corresponding movement (9*mvnt*'—FIG. 4) within the 3D model, defining the virtual viewpoints (9view10, 9view11, 9view12—FIG. 4) from which the final video is rendered.

Tracking with SLAM (Simultaneous Localization and Mapping): General Principle: SLAM is a more advanced technique that combines sensor data (often from cameras or depth sensors) with algorithms to simultaneously: Localization: Determine the sensor's position within an unknown environment. Mapping: Build a map of the surrounding environment. Key Features: Feature Recognition: SLAM algorithms identify distinctive features in the environment and track their positions over time. Loop Closure: When the sensor revisits a previously mapped area, the algorithm recognizes the location and corrects for accumulated errors, reducing drift.

Specific Application in the Invention: A visual SLAM system 8CPU+8*mem*3+8track (FIG. 1B) could be implemented in the smartphone to enhance tracking accuracy. The camera 8*cam* would capture visual information about the environment, and the SLAM algorithms would process this data along with readings from the gyroscope 8*g* and accelerometer 8*a*. This would result in a more robust and accurate estimation of the smartphone's movement (9*mvnt*—FIG. 1A).

Combining Inertial Sensors and SLAM: Combining inertial sensors (gyroscope and accelerometer) with SLAM offers significant benefits for tracking accuracy: Complementary Strengths: Inertial sensors provide high-frequency motion data, while SLAM offers absolute position information and drift correction. Sensor Fusion: Algorithms can fuse data from both sources to produce a more accurate and reliable estimate of the device's movement. Reduced Drift: SLAM's loop closure capabilities help correct for the inherent drift in inertial sensor readings. In the context of the invention, combining these tracking methods results in a highly precise understanding of the user's movement during image capture. This allows for a more convincing integration of the real-world object into the synthetic scene, as the flat-surfaced 3D objects can be positioned and rendered with greater fidelity, enhancing the overall illusion.

Clarification Regarding the Nature of the "Illusion": The invention aims to create a visual illusion that convincingly integrates a real-world object into a synthetic 3D scene. It's important to clarify that this illusion is perspective-dependent. It relies on presenting the rendered images from specific viewpoints that match the original camera positions during capture. When viewed from these intended viewpoints, the integration appears seamless and realistic. However, if viewed from other angles or perspectives, the illusion may be broken, revealing the flat nature of the 3D-renderable objects. This perspective-dependent illusion is analogous to how a forced perspective trick in photography might appear convincing from one angle but reveal the artifice from a different viewpoint. The invention leverages this principle to achieve compelling results within the constraints of efficient rendering and computational resources.

Clarification Regarding Potential Applications: The invention's core functionality, integrating a real-world object into a synthetic scene, can be applied to a wide range of scenarios and industries. Some potential applications include: Augmented Reality (AR): Enhance AR experiences by seamlessly placing real-world objects captured by users into virtual environments. Virtual Advertising: Integrate real products or advertisements into virtual scenes, creating more immersive and engaging marketing experiences. Film and Video Production: Simplify the process of adding real objects into computer-generated imagery (CGI) environments for film and video production. Training and Simulation: Create realistic training simulations by integrating captured objects into virtual environments, providing a more immersive learning experience. Gaming and Entertainment: Enhance games and interactive experiences by allowing players to seamlessly bring real-world objects into the virtual world. This list is not exhaustive, and the invention's versatility allows for further exploration and adaptation to various creative and practical uses.

Clarification Regarding Object Selection and Extraction: The invention focuses on integrating a specific target object (1*obj*1—FIG. 1A) into the synthetic scene. The selection of this target object, as well as its extraction from the captured images, can be achieved through various methods: Manual Selection: The user could manually designate the target object within the captured images. Automated Object Detection: Computer vision algorithms, potentially powered by machine learning, could be used to automatically detect and segment the target object based on its characteristics (shape, color, texture, etc.). Hybrid Approach: A combination of manual input and automated detection could be employed, allowing the user to refine or correct automated selections. The choice of method will depend on the specific application, the complexity of the scene, and the desired level of user interaction.

Benefits Relative to Complete 3D Object Extraction: The invention's approach, using flat-surfaced 3D-renderable objects instead of complete 3D models, offers several advantages compared to traditional methods of 3D object extraction and integration: Computational Efficiency: Creating, manipulating, and rendering flat surfaces is significantly less computationally demanding than working with complex 3D models. This makes the process faster and more efficient, particularly important for real-time applications or resource-constrained devices. Simplified Processing: The algorithms for object extraction, texture mapping, and placement are simpler for flat surfaces, requiring less processing power and memory. Ease of Integration: Placing and orienting flat surfaces within a 3D scene is easier and more flexible than integrating complex 3D objects, especially when dealing with dynamic scenes or moving objects. Reduced Data Requirements: The data required to represent a flat surface is significantly less than a full 3D model, reducing storage and transmission needs. While full 3D object extraction and integration can provide good levels of realism and interactivity, the invention's approach achieves a compelling level of visual fidelity while being more efficient and practical for many applications. It prioritizes creating a convincing illusion from specific viewpoints, striking a balance between visual quality and computational demands.

Real-Time Processing on a Smartphone: In one embodiment, the entire process, from capture to rendering, can potentially be performed in real-time directly on the user's smartphone, depending on the device's processing capabilities and the complexity of the scene: Capture: The smartphone's camera 8*cam* (FIG. 1B) captures a stream of images. Tracking: The onboard tracking sub-system 8track (FIG. 1B), utilizing the gyroscope 8*g* and accelerometer 8*a* (and potentially aided by visual SLAM), provides real-time data on the phone's movement and orientation. Object Extraction: On-device machine learning models 8code1 (FIG. 1C), optimized for mobile processing, could be used to rapidly identify and extract the target object from each frame. Flat Surface Generation: The extracted object is quickly transformed into a flat-surfaced 3D representation, with the texture mapped from the captured image. Placement and Rendering: Leveraging the tracking data, the flat surfaces are positioned and oriented within a pre-loaded or dynamically generated 3D scene. A mobile-optimized rendering engine renders the scene from the corresponding viewpoints, creating the integrated view in real-time. This real-time processing on a smartphone unlocks a range of possibilities for immersive and interactive applications. Users could seamlessly integrate real-world objects into AR experiences, games, or virtual environments, creating captivating and personalized interactions without reliance on external servers or cloud processing.

Selfie Integration: From Post-Processed Video to Real-Time Dynamic Backgrounds. Here are example scenarios showcasing the use of "selfie" shots captured by the front camera for both post-processed video and real-time integration:

Scenario A: Post-Processed Selfie Video in a Fantasy Landscape: Capture: A user takes a short video selfie using their smartphone's front camera 8*cam* (FIG. 1B). They move around slightly, perhaps striking different poses, while the tracking sub-system 8track captures their movements 9*mvnt* using the gyroscope 8*g* and accelerometer 8*a*. Processing: The captured video is uploaded to an app or service that utilizes the invention's principles. The image processing server 8server1 extracts the user (1*obj*1) from each frame of the video, separating them from the background. The rendering server 8server2 loads a breathtaking 3D model 2model of a fantastical landscape—maybe a lush forest with glowing mushrooms or a majestic mountain range under a starry sky. 3D Object Generation & Integration: For each frame, a flat-surfaced 3D object (2model10, 2model11, 2model12—FIG. 2) is generated, textured with the extracted image of the user. These objects are then placed and oriented within the fantasy landscape 2model, mimicking the user's tracked movements and poses. The original camera movements are translated to corresponding viewpoints 9view10, 9view11, 9view12 within the 3D scene. Rendering and Enhancements: The final video is rendered, showing the user seamlessly integrated into the fantasy environment. Lighting effects 2depth, shadows 2shadow, and reflections 2reflection (potentially using elements like reflective pools of water 2model3) enhance the realism, making it appear as if the user were truly present in this magical world.

Scenario B: Real-Time Dynamic Backgrounds for Video Calls: Capture: Imagine a user initiating a video call. Their smartphone's front camera 8*cam* continuously captures their image, while the tracking sub-system 8track constantly monitors their movements 9*mvnt*. Real-Time Processing: The smartphone utilizes a mobile-optimized version of the invention's system. On-device machine learning models 8code1 (FIG. 1C) rapidly extract the user 1*obj*1 from the camera feed, separating them from their real background. Dynamic Background Rendering: Instead of a static picture, the user can select a dynamic 3D scene 2model as their background. It could be a calming beach with swaying palm trees and gentle waves, or a futuristic cityscape with flying vehicles and a vibrant skyline. Seamless Integration: For each frame, a flat-surfaced 3D object is dynamically generated, textured with the user's extracted image. It's placed and oriented within the selected 3D scene, matching the user's movements (e.g., rotation, moving/walking, holding hand movements) tracked in real-time. The scene is rendered from a viewpoint directly facing the user, creating a continuous, real-time composite video feed. Result: During the video call, the user appears seamlessly integrated into the dynamic 3D background, replacing their actual surroundings. They could be discussing business from a virtual office overlooking a bustling city, or catching up with friends from a relaxing beach, enhancing the video call experience with personalized and immersive environments.

These examples illustrate the versatility of the invention, showcasing its potential to transform both post-processed videos and real-time applications like video calls, creating more engaging and immersive experiences for users.

Figure 8A:
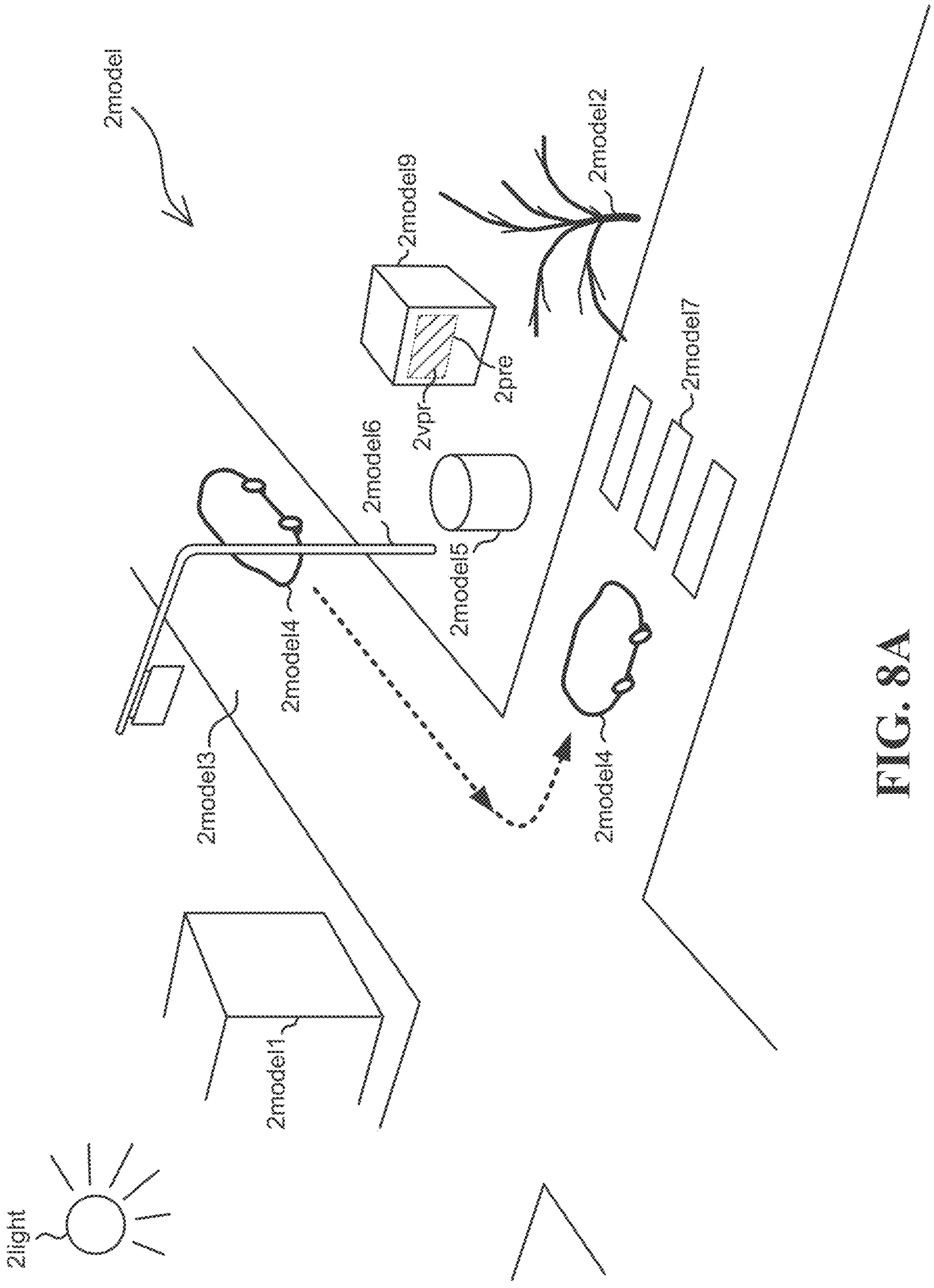
FIG. 8A illustrates one embodiment of defining a video-projection-area associated with a three-dimensional object appearing in a 3D scene.

FIG. 8A illustrates one embodiment of defining a video-projection-area 2*vpr* associated with a three-dimensional object 2model9 within the 3D scene 2model. The video-projection-area 2*vpr* is a designated region on a flat side of the three-dimensional object 2model9 within the 3D scene. The positioning of this video-projection-area 2*vpr* enables the future embedding of an external video stream, creating the illusion that the external video is being projected onto the designated flat side of the three-dimensional object 2model9. This strategic arrangement seamlessly integrates the external video stream with the main video, enhancing the viewer's experience and fostering an immersive visual effect. In this process, a sequence of pre-markings 2*pre* is generated on the flat side of the three-dimensional object 2model9 in 3D space. These pre-markings 2*pre* establish reference points, ensuring meticulous alignment with the geometry of the object. Ultimately, these reference points contribute to the precise projection of the external video onto the designated video-projection-area 2*vpr*, augmenting the realism and impact of the visual presentation.

In various outdoor scenarios, three-dimensional objects 2model9 featuring flat sides can serve as versatile canvases for video projection. For instance, a prominent street billboard could dynamically display video advertisements, a park kiosk might offer interactive maps by projecting content onto its flat panel, and outdoor stages with LED screens could create captivating visual effects during performances. Additionally, public art installations could use their flat surfaces to showcase video art, while building facades could transform into dynamic displays, exhibiting advertisements or artistic content to engage viewers. By defining designated video-projection-areas 2*vpr* in conjunction with these objects' flat sides, these outdoor environments can be enhanced with captivating and immersive video projection experiences when rendered into a displayable video.

Figure 8B:
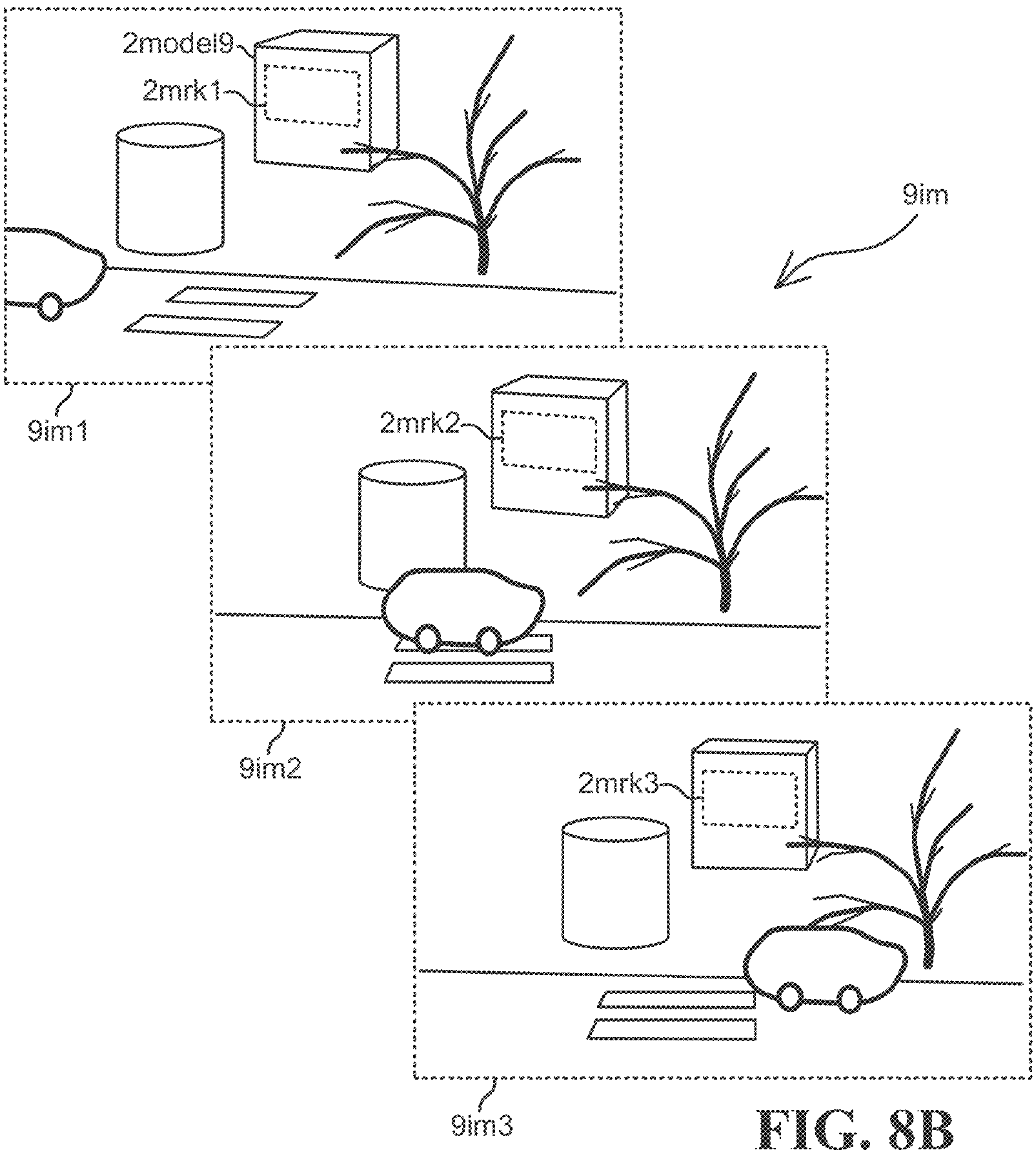
FIG. 8B illustrates one embodiment of generating markings in conjunction with the main video, each marking representing an instance of the video-projection-area as it appears in the respective image of the main video.

FIG. 8B illustrates one embodiment of generating markings 2*mrk*1, 2*mrk*2, 2*mrk*3 in conjunction with the main video 9*im*, where each marking represents an instance of the video-projection-area 2*vpr* as it appears in the respective image 9*im*1, 9*im*2, 9*im*3 of the main video that may be rendered from the 3D scene 2model. In this embodiment, a sequence of images forming the main video 9*im*1, 9*im*2, 9*im*3 of a certain scene is associated with the three-dimensional object 2model9 and its designated video-projection-area 2*vpr*. Within each image 9*im*1, 9*im*2, 9*im*3, specific markings 2*mrk*1, 2*mrk*2, 2*mrk*3 are generated, aligning with instances of the video-projection-area 2*vpr* on the three-dimensional object 2model9. These markings 2*mrk*1, 2*mrk*2, 2*mrk*3 serve as visual cues, enabling accurate tracking and alignment of the external video stream for future embedding. The generation of these markings 2*mrk*1, 2*mrk*2, 2*mrk*3 in conjunction with the main video 9*im* paves the way for seamless integration of an external video and the creation of an immersive visual effect that appears as though the external video is being projected onto the flat side of the three-dimensional object 2model9 within the main video 9*im*.

In one embodiment, during the process of transforming the 3D pre-markings 2*pre* into 2D markings 2*mrk*, each pre-marking 2*pre* is mapped onto its corresponding image in the main video 9*im*1, 9*im*2, 9*im*3 using geometric transformation techniques. These techniques involve accurately determining the two-dimensional location of each pre-marking 2*pre* on the flat side of the three-dimensional object 2model9 as it appears in the 3D space. The geometric shape of the markings 2*mrk*1, 2*mrk*2, 2*mrk*3 depends on the perspective of the viewing point that was used in conjunction with rendering the 3D scene into the main video 9*im*. By appropriately projecting these pre-markings 2*pre* onto the 2D space of the main video images 9*im*1, 9*im*2, 9*im*3, the sequence of 3D reference points is effectively transformed into the sequence of 2D markings 2*mrk*1, 2*mrk*2, 2*mrk*3. This transformation ensures that the markings align precisely with the instances of the video-projection-area 2*vpr* within the images of the main video 9*im*1, 9*im*2, 9*im*3, ultimately contributing to the seamless illusion of external video projection.

For instance, a scenario in considered where the 3D scene is rendered into the main video 9*im*, and during this rendering process, the pre-markings 2*pre* "naturally" translate into the 2D markings 2*mrk*1, 2*mrk*2, 2*mrk*3. Let's say that specific colors are assigned to the pre-markings 2*pre* on the flat side of the three-dimensional object 2model9. These colors serve as visual indicators that align with the designated video-projection-area 2*vpr* in the 3D scene. As the rendering process transforms the 3D scene into the main video 9*im*, these colored pre-markings 2*pre* seamlessly transition into the 2D markings 2*mrk*1, 2*mrk*2, 2*mrk*3. Alternatively, non-visual metadata, such as specific data attributes associated with the pre-markings 2*pre*, can be employed to locate these reference points in the 2D space of the main video. This metadata ensures accurate placement of the 2D markings 2*mrk*1, 2*mrk*2, 2*mrk*3, maintaining alignment with the instances of the video-projection-area 2*vpr* within the main video 9*im*1, 9*im*2, 9*im*3, thereby contributing to the compelling illusion of external video projection.

Figure 8C:
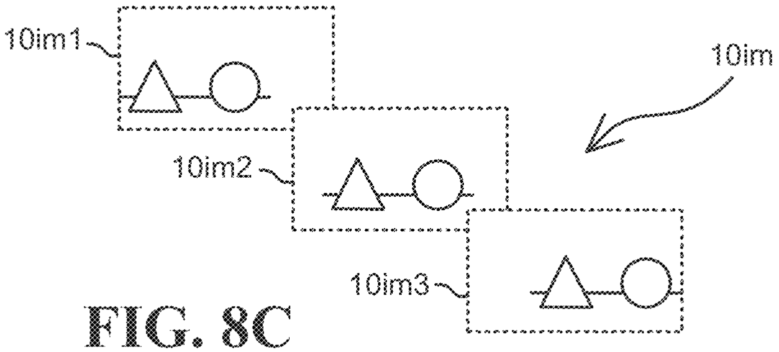
FIG. 8C illustrates one embodiment of an external video to be later integrated into the main video, creating the illusion of the external video being projected onto the flat side of the 3D object in the main video.

FIG. 8C illustrates one embodiment of an external video stream 10*im* to be integrated within the main video 9*im*. In this context, the external video 10*im* comprises a sequence of images 10*im*1, 10*im*2, 10*im*3 that is intended to be seamlessly embedded within the main video 9*im*, creating a harmonious visual experience. The external video 10*im* can encompass a variety of content types, such as advertisement videos, music videos, news clips, or tutorial videos, catering to diverse viewer preferences. By associating the external video 10*im* with the main video 9*im* and aligning it with the sequence of markings 2*mrk*1, 2*mrk*2, 2*mrk*3, an illusion is generated, giving the impression that the external video 10*im* is being projected onto the flat side of the three-dimensional object 2model9. Through this integration, the main video 9*im* becomes a canvas for the external video's immersive projection, enhancing the overall visual impact of the scene.

Figure 8D:
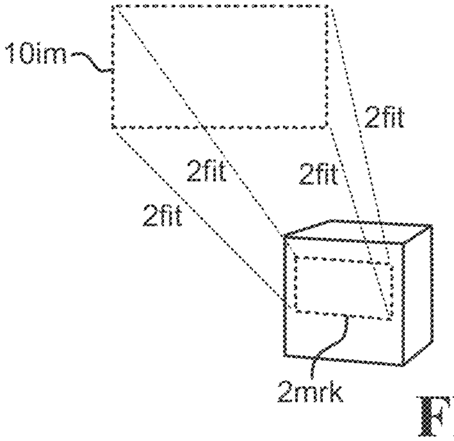
FIG. 8D illustrates one embodiment of fitting images in the external video stream within boundaries of respective markings, preparing them for embedding within the main video.

FIG. 8D illustrates one embodiment of fitting images in the external video stream within boundaries of respective markings, preparing them for embedding within the main video. In this embodiment, the process of fitting a sequence of images 10*im*1, 10*im*2, 10*im*3 from the external video 10*im* is executed meticulously. The purpose of this fitting is to ensure that the external video's content aligns seamlessly with the designated video-projection-area 2*vpr* on the flat side of the three-dimensional object 2model9, creating a visual illusion of projection. Each image in the sequence undergoes reshaping to harmoniously integrate with the main video 9*im*, preserving the illusion that the external video 10*im* is being projected onto the three-dimensional object 2model9. As a result of this meticulous fitting process, the images 10*im*1, 10*im*2, 10*im*3 are positioned within the confines of the respective markings 2*mrk*1, 2*mrk*2, 2*mrk*3 in the main video 9*im*, thereby laying the foundation for the subsequent embedding process. The alignment of the external video's images with the designated video-projection-area and markings creates a seamless transition that enhances the immersive experience for viewers.

During the rendering process of the three-dimensional scene into the main video, the appearance of the video-projection-area 2*vpr* within the main video is influenced by the chosen viewing angle used in the rendering. This perspective-dependent transformation introduces a dynamic dimension to the integration process, requiring various types of fittings to maintain the illusion of seamless projection onto the flat side of the three-dimensional object 2model9. Depending on the viewing angle, different types of adjustments are needed to harmoniously align the external video's content with the markings 2*mrk*1, 2*mrk*2, 2*mrk*3 on the main video 9*im*.

For instance, when the rendering process employs a perspective that is head-on or nearly head-on to the designated video-projection-area 2*vpr*, linear distortion adjustments may be needed. These adjustments involve resizing and reshaping the external video's images to accommodate the perspective of the rendering. Alternatively, in cases where the viewing angle is at an angle to the flat side of the three-dimensional object 2model9, rotation adjustments become essential. Such scenarios require rotating the external video's images to align with the orientation of the designated video-projection-area within the main video.

Moreover, perspectives that are off-center or slanted may necessitate a combination of adjustments, including both linear distortion and rotation. This could involve warping the external video's images to account for the specific perspective and creating the illusion of natural projection onto the flat side of the three-dimensional object. These fitting adjustments can vary widely, addressing the diverse range of potential viewing angles during the rendering process. The adaptive nature of these fittings ensures that the illusion of projection remains consistent across various perspectives, enhancing the visual cohesion of the overall scene and viewer experience.

Figure 8E:
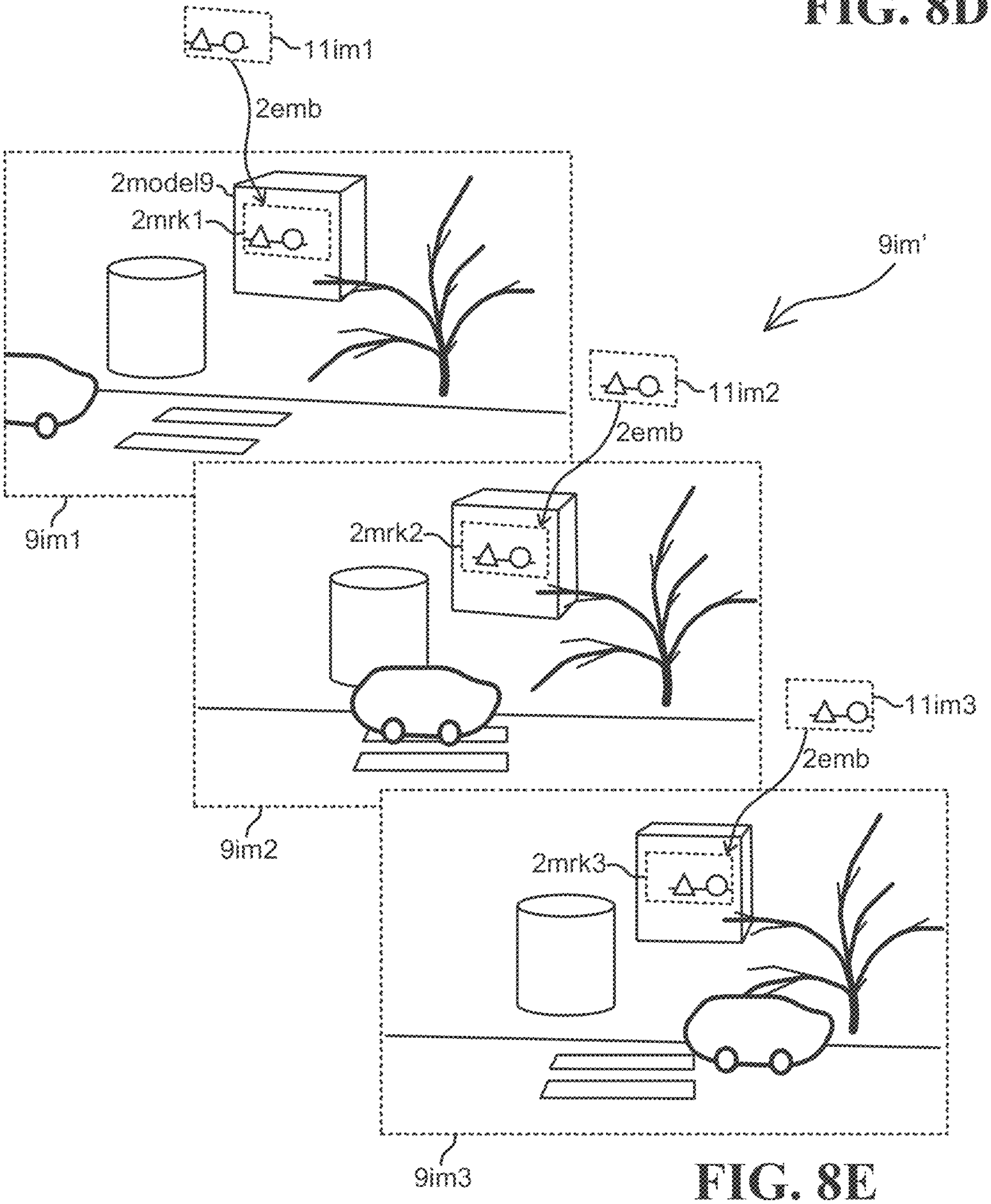
FIG. 8E illustrates one embodiment of embedding adjusted images within the main video, creating the illusion of the external video being projected on the 3D object in the main video.

FIG. 8E illustrates one embodiment of embedding adjusted images within the main video, extending the illusion of projection. In this embodiment, the process of embedding takes the meticulously fitted and adjusted images, referred to as 1*lim*1, 1*lim*2, 1*lim*3, from the external video and seamlessly integrates them into the main video 9*im*. This integration occurs in conjunction with the respective markings 2*mrk*1, 2*mrk*2, 2*mrk*3 within the main video, aligning precisely with the designated video-projection-area 2*vpr*. As a result, the external video's content is convincingly projected onto the flat side of the three-dimensional object 2model9 within the main video 9*im*. Once embedded, the illusion of projection is sustained, creating a compelling visual effect that enhances the viewer's engagement. The culmination of this process leads to the creation of an extended main video denoted as 9*im*', now enriched with the embedded external video 10*im*. This combined video is ready to be streamed out to external devices, allowing audiences to experience the captivating visual interplay of the integrated content. In a scenario where the main video 9*im* is a computer-generated imagery (CGI) rendered motion picture depicting a bustling cityscape, the three-dimensional object 2model9 represents a prominent advertising outdoor board located along a busy street. The designated video-projection-area 2*vpr* on the flat side of the advertising board provides an ideal canvas for projecting the external video 10*im*, which is an advertisement for a specific brand. As the CGI motion picture unfolds, the carefully adjusted images from the external video seamlessly integrate with the scene. The projected advertisement becomes an integral part of the urban landscape, conveying the message of the brand with a striking illusion of being projected onto the advertising board. Viewers are immersed in a dynamic visual experience where the virtual and real elements coalesce to create a memorable and impactful advertising presence within the CGI-rendered world.

In one embodiment, a scenario is considered where the main video 9*im* is a captivating motion picture streamed to a specific viewer's device. Within this motion picture, the three-dimensional object 2model9 takes the form of an interactive display in a futuristic setting. The designated video-projection-area 2*vpr* on the interactive display offers an opportunity for tailored content integration. The external video 10*im* is an engaging promotional video for a technology product, and it is strategically embedded within the interactive display. As the viewer watches the motion picture, the external video seamlessly integrates into the interactive display, enhancing the viewer's experience. This integration takes into account the viewer's preferences, demographic information, and past interactions to select the most relevant content for the external video. The illusion of projection onto the interactive display creates a personalized and immersive experience for the viewer, demonstrating how seamlessly integrated content can be tailored to individual preferences and context.

In one embodiment, another scenario is considered where the main video 9*im* portrays an immersive exploration of an art gallery showcasing diverse artworks. Within this context, the three-dimensional object 2model9 embodies a prominent canvas hanging on one of the gallery walls. This canvas serves as the designated video-projection-area 2*vpr*, inviting the integration of external visual elements. The external video 10*im* takes the form of a carefully chosen still image, seamlessly embedded into the canvas within the art gallery scene. This integration creates a seamless blend between the external image and the gallery's ambiance. As viewers engage with the main video, the embedded image becomes an integral part of the virtual art gallery, exemplifying the potential of merging static visual content with dynamic environments to enhance storytelling and viewer experience.

Moreover, within this artistic narrative, a dynamic dimension emerges where the actual image 10*im* can be tailored to match the viewer's preferences and characteristics. As viewers interact with the art gallery video, the external image seamlessly adapts based on factors such as the viewer's profile, interests, and past interactions. This personalized selection process ensures that the embedded image resonates with each viewer, creating a unique and engaging experience. The fusion of artistic representation and personalized adaptation underscores the versatility of integrated content, showcasing how technology can transform traditional art forms into interactive and personalized visual narratives. In one embodiment, a different scenario is considered where the main video 9*im* is a documentary-style film exploring the rich history of a city. In this context, the three-dimensional object 2model9 represents an iconic historical monument featured in the documentary. While the main video is not necessarily rendered from a 3D scene, the designated video-projection-area 2*vpr* on the monument's surface presents an opportunity for content integration. The external video 10*im* is a series of archival images showcasing the monument's evolution over time. These images are thoughtfully adjusted and seamlessly embedded onto the monument's surface within the documentary footage. This integration enhances the storytelling by visually connecting the historical images with the real-world monument, creating an engaging narrative that brings the past and present together. This example showcases how integrated content can enrich non-3D scenes, adding layers of depth and context to the viewer's experience.

In one embodiment, and in scenarios where the main video 9*im* is not rendered from a 3D scene, an alternative approach can be employed to generate the markings. In this context, a sophisticated AI model specialized in identifying objects with flat surfaces in videos comes into play. This AI model is trained to analyze the main video and accurately locate suitable areas for embedding external content. The identified regions serve as the basis for generating the sequence of markings 2*mrk*1, 2*mrk*2, 2*mrk*3. Each marking corresponds to a designated area on a flat surface, aligning with the object of interest within the main video. By utilizing AI technology, the integration process adapts to different video sources, demonstrating the versatility of the system in accommodating various scenarios and enriching content integration with minimal user intervention.

In one embodiment, yet another scenario is considered where the main video 9*im* is streamed to a specific user in real time, tailored to their preferences and viewing history. As the user engages with the video, the embedding process takes place seamlessly. In this instance, the external video 10*im* is chosen from a curated set of possibilities, each catering to the user's interests. The integration process occurs on-the-fly as the user watches the main video, with the selected external video being adjusted and embedded into the scenes in real time. This live integration creates a personalized viewing experience, where the external content becomes an integral part of the narrative, aligning with the user's preferences and enhancing their engagement. This example showcases the power of real-time adjustments and personalized content integration, offering a dynamic and immersive viewing experience tailored to the individual viewer.

Figure 9:
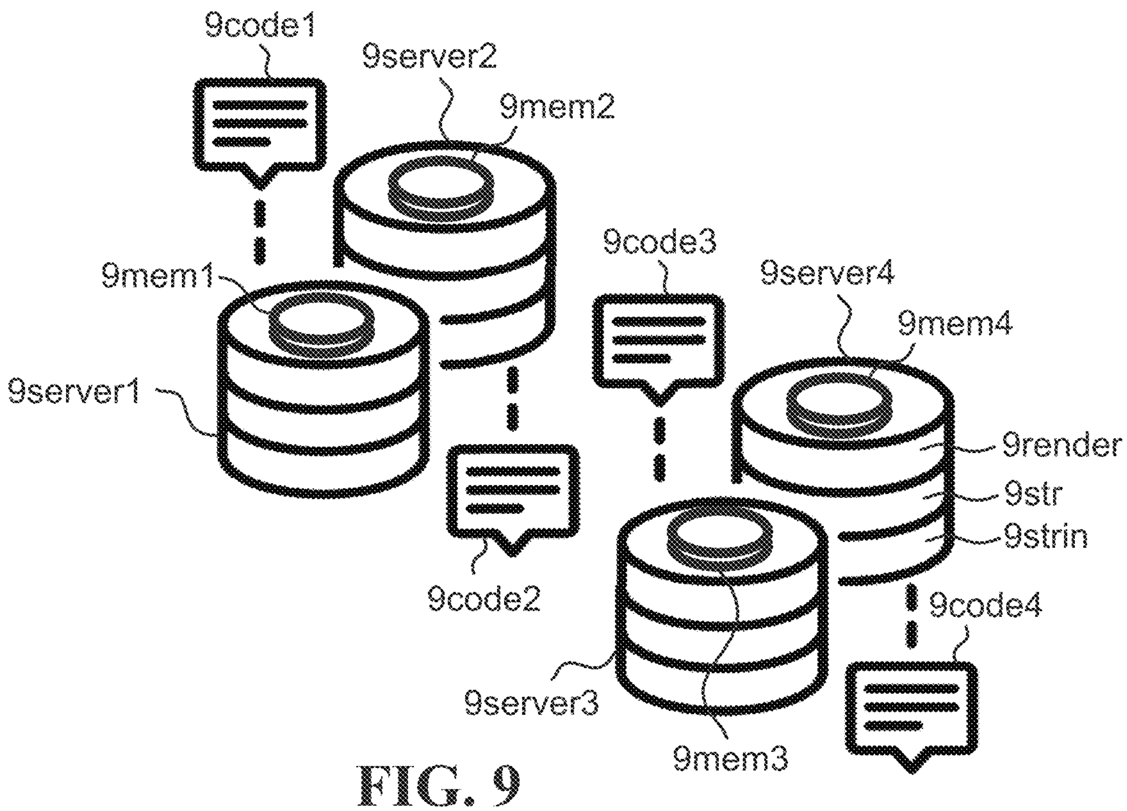
FIG. 9 illustrates one embodiment of a system operative to define a video-projection-area on a flat side of a three-dimensional object within a 3D scene, enabling seamless integration of external video content into the main video.

FIG. 9 illustrates one embodiment a system operative to define a video-projection-area 2*vpr* on a flat side of a three-dimensional object 2model9 within a 3D scene, enabling seamless integration of external video content into the main video 9*im*. The system comprises a video-projection-area defining sub-system 9server1 responsible for establishing the designated region on the 3D object, which serves as the canvas for embedding the external video. The marking generation and association sub-system 9server2 generates a sequence of markings 2*mrk*1, 2*mrk*2, 2*mrk*3 corresponding to instances of the video-projection-area within the main video. These markings are associated with the sequence of images 9*im*1, 9*im*2, 9*im*3 in the main video, enabling future embedding of the external video within the main video and in conjunction with the sequence of markings. The system also features an image fitting and embedding sub-system 9server3 responsible for adjusting each image in the external video stream to fit within the boundaries of the respective markings and embedding them in the main video, creating the illusion of projection on the flat side of the 3D object. Additionally, the system includes a streaming sub-system 9server4 configured to receive and process the main video and external video stream. The rendering module 9render within the streaming sub-system renders the finished main video with the embedded external video, while the streaming output module 9*str* delivers the finished video for streaming purposes. The streaming input module 9*strin* receives and processes the external video stream in real-time, the transcoding module (not depicted) converts the external video stream into a compatible format for integration, and the buffering module (not depicted) stores and manages streamed external video segments to ensure smooth playback and synchronization with the main video. This system configuration provides a comprehensive solution for integrating dynamic content seamlessly into pre-existing scenes.

One embodiment is a system operative to facilitate embedding of an external video stream within a main video of a certain scene, comprising: a video-projection-area defining sub-system 9server1 (FIG. 9A) configured to define a video-projection-area 2*vpr* associated with a flat side of a three-dimensional (3D) object 2model9 appearing in the main video 9*im* of the certain scene, wherein the main video comprises a sequence of images 9*im*1, 9*im*2, 9*im*3 of the certain scene; a marking generation and association sub-system 9server2 configured to generate a sequence of markings 2*mrk*1, 2*mrk*2, 2*mrk*3 in conjunction with the main video 9*im*, wherein each marking in the sequence represents a respective instance of the video-projection-area 2*vpr* as it appears in the respective image 9*im*1, 9*im*2, 9*im*3 of the main video and associate the sequence of markings with the sequence of images in the main video, thereby enabling future embedding of the external video 10*im* within the main video and in conjunction with the sequence of markings; an image fitting and embedding sub-system 9server3 configured to adjust each image in a sequence of images 10*im*1, 10*im*2, 10*im*3 in the external video stream to fit within the boundaries of the respective marking in the sequence of markings 2*mrk*1, 2*mrk*2, 2*mrk*3, in conjunction with the main video, and embed each of the adjusted images 1*lim*1, 1*lim*2, 11*im*3 within the main video, in conjunction with the respective marking in the sequence of markings, thereby creating an illusion that the external video 10*im* is being projected on the flat side of the 3D object 2model9 as it appears in the main video 9*im*.

In one embodiment, the system further comprising a streaming sub-system 9server4 configured to receive the main video 9*im* and the external video 10*im*, and generate a finished main video 9*im*' with the external video 10*im* embedded therein, wherein the streaming sub-system comprises: a rendering module 9render configured to render the finished main video 9*im*' with the embedded external video 10*im*; and a streaming output module 9*str* configured to deliver the finished main video 9*im*' with the embedded external video 10*im* for streaming purposes.

In one embodiment, both the main video 9*im* and the external video 10*im* are pre-stored 9*mem* in the system.

In one embodiment, the main 9*im* video is pre-stored 9*mem* in the system and the external video 10*im* is streamed into the system in conjunction with said delivering of the finished video 9*im'*.

In one embodiment, both the main video 9*im* and the external video 10*im* are streamed into the system in conjunction with said delivering of the finished video 9*im'*.

In one embodiment, the streaming sub-system 9server4 further comprises: a streaming input module 9*strin* configured to receive and process the external video stream 10*im* for real-time streaming into the system; a transcoding module configured to convert the external video 10*im* stream into a compatible format for seamless integration with the main video 9*im*; a buffering module configured to store 9*mem* and manage the streamed external video segments to ensure smooth playback and synchronization with the main video.

In one embodiment, the system further comprising a main video downloading module configured to download the main video 9*im* in its entirety for local storage 9*mem*, enabling subsequent processing and embedding of the external video stream 10*im* in conjunction with the downloaded main video.

Figure 10A:
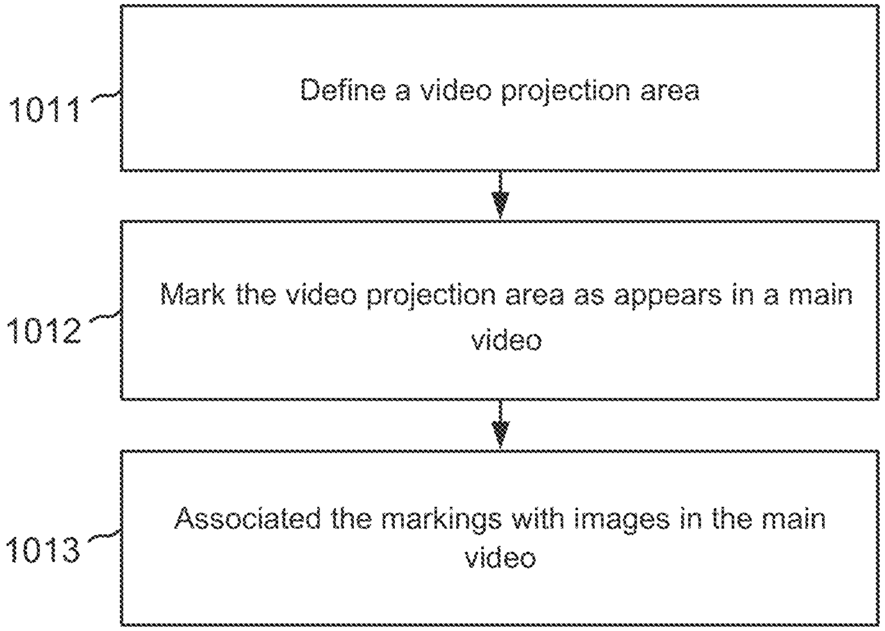
FIG. 10A illustrates one embodiment of a method for facilitating embedding of an external video stream within a main video of a certain scene.

FIG. 10A illustrates one embodiment of a method (FIG. 10A) for facilitating embedding of an external video stream within a main video of a certain scene. The method includes: In step 1011, defining a video-projection-area 2*vpr* (FIG. 8A) associated with a flat side of a three-dimensional (3D) object, e.g., 2model9 (FIG. 8A), appearing in the main video 9*im* (FIG. 8B) of the certain scene, in which the main video 9*im* comprises a sequence of images 9*im*1, 9*im*2, 9*im*3 of the certain scene. In step 1012, generating a sequence of markings 2*mrk*1, 2*mrk*2, 2*mrk*3 (FIG. 8B) in conjunction with the main video 9*im*, in which each of the markings in the sequence is a marking of a respective one instance of the video-projection-area 2*vpr* as appears in the respective image in the main video. In step 1013, associating the sequence of markings 2*mrk*1, 2*mrk*2, 2*mrk*3 with the sequence of images 9*im*1, 9*im*2, 9*im*3 in the main video, thereby allowing future embedding 2*emb* (FIG. 8E) of the external video 10*im* within the main video 9*im* and in conjunction with the sequence of markings, so as to create an illusion (FIG. 8E) that the external video stream 10*im* (FIG. 8C) is projected on the flat side of the 3D object 2model9.

In one embodiment, the method further comprises: fitting 2*fit* (FIG. 8D), by reshaping, each of a sequence of images 10*im*1, 10*im*2, 10*im*3 (FIG. 8C) in the external video stream into boundaries of the respective marking in the sequence of markings 2*mrk*1, 2*mrk*2, 2*mrk*3 and in conjunction with the main video 9*im*, thereby generating a respective sequence of adjusted images 1*lim*1, 11*im*2, 11*im*3 (FIG. 8E) associated with the external video 10*im*; and embedding 2*emb* (FIG. 8E) each of the adjusted images 1*lim*1, 11*im*2, 11*im*3 within the main video 9*im* and in conjunction with the respective marking in the sequence of markings 2*mrk*1, 2*mrk*2, 2*mrk*3, thereby creating an illusion that the external video 10*im* is being projected on the flat side of the 3D object 2model9 as appears in the main video 9*im*.

In one embodiment, the method further comprises: receiving information regarding a current viewer of the main video 9*im*; and selecting, based on said information and prior to said fitting 2*fit* and embedding 2*emb*, the external video 10*im* from a set of possible external videos.

In one embodiment, said information is received only after: (i) the entire associated sequence of images 9*im*1, 9*im*2, 9*im*3 of the certain scene already exists and (ii) said association of the sequence of markings 2*mrk*1, 2*mrk*2, 2*mrk*3 with the sequence of images in the main video 9*im* is already done.

In one embodiment, said information is received at least one minute after the sequence of markings 2*mrk*1, 2*mrk*2, 2*mrk*3 is already done.

In one embodiment, said information is received at least ten minutes after the sequence of markings 2*mrk*1, 2*mrk*2, 2*mrk*3 is already done.

In one embodiment, said fitting 2*fit* and embedding 2*emb*, of the sequence of images 10*im*1, 10*im*2, 10*im*3 of the external video 10*im*, is done only after the entire main video 9*im* is all set and already includes: (i) all of the associated sequence of images 9*im*1, 9*im*2, 9*im*3 of the certain scene and (ii) said association the sequence of markings 2*mrk*1, 2*mrk*2, 2*mrk*3 with the sequence of images 9*im*1, 9*im*2, 9*im*3 in the main video.

In one embodiment, said main video 9*im* is 3D-rendered from a 3D computer-generate scene 2model (FIG. 8A); said 3D object 2model9 is a synthetic 3D object appearing in the 3D computer-generate scene 2model; and said definition of the video-projection-area 2*vpr* is done in conjunction with the 3D computer-generate scene 2model and 3D object 2model9, prior to the main video 9*im* being 3D-rendered from the 3D computer-generate scene 2model9.

In one embodiment, said flat side of the 3D object 2model9 is defined in 3D space, in which the method further comprises: generating a sequence of pre-markings 2*pre* (FIG. 8A), in which the pre-markings are generated in conjunction with the flat side of the 3D object 2model9 and in 3D space.

In one embodiment, said pre-marking 2*pre* is done by 3D marking the flat side of the 3D object 2model9; and said generating of the sequence of markings 2*mrk*1, 2*mrk*2, 2*mrk*3 is done by two-dimensionally locating the 3D markings in the main video 9*im*.

In one embodiment, said definition of the video-projection-area 2*vpr* is done in conjunction with a machine-learning model trained to identify flat surfaces of objects in videos.

In one embodiment, the external video 10*im* is associated with at least one of: (i) an advertisement video, (ii) a music video, (iii) a news clip, and (iv) an tutorial video.

In one embodiment, said markings 2*mrk* are done by assigning a pre-determined specific color to the pixels associated with the flat side of the 3D object 2model9.

In one embodiment, said markings 2*mrk* are done by assigning a specific metadata to the pixels associated with the flat side of the 3D object 2model9.

In one embodiment, said markings 2*mrk* are done by assigning a specific metadata that defines the two-dimensional location of the markings in the sequence of images 9*im*1, 9*im*2, 9*im*3 in the main video 9*im*.

In one embodiment, said defining and generating of the sequence of markings 2*mrk*1, 2*mrk*2, 2*mrk*3 is done once; and said fitting 2*fit* and embedding 2*emb* is done multiple times respectively in conjunction with multiple external videos 10*im*.

In one embodiment, each of the fitting 2*fit* and embedding 2*emb*, of the respective one of the multiple external videos 10*im*, is done based on who is watching the main video 9*im*.

In one embodiment, each of the fitting 2*fit* and embedding 2*emb*, of the respective one of the multiple external videos 10*im*, is done based on additional information associated with who is watching the main video, in which said additional information comprises at least one of: (i) age, (ii) gender, and (iii) past preferences.

In one embodiment, said defining and generating of the sequence of markings 2*mrk*1, 2*mrk*2, 2*mrk*3 is done by post-processing the main video 9*im*; and said fitting 2*fit* and embedding 2*emb* is done is real time while a person is watching the main video 9*im*.

Figure 10B:
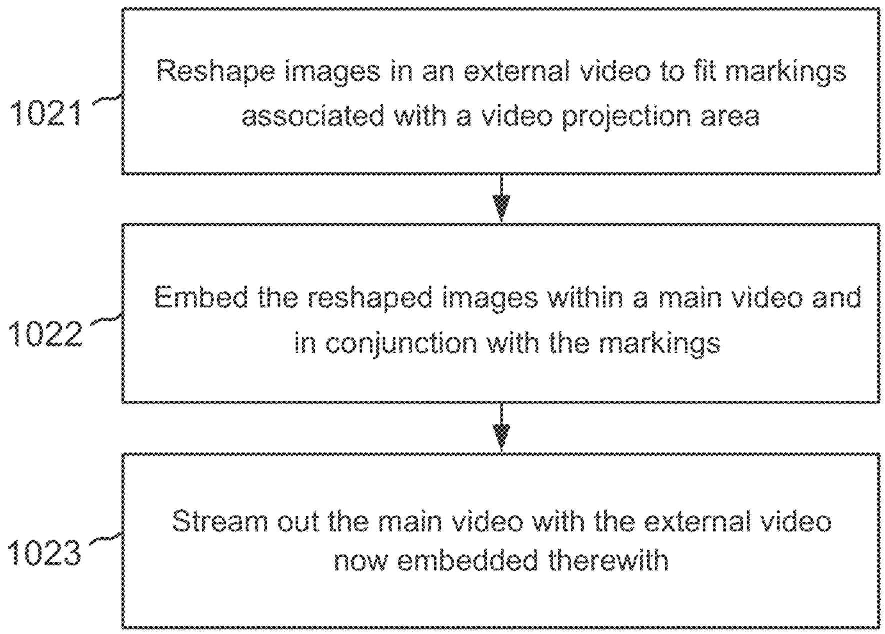
FIG. 10B illustrates one embodiment of a method for embedding an external video stream within a main video of a certain scene so as to create an illusion of the external video being projected on a flat side of a 3D object appearing in the main video.

FIG. 10B illustrates one embodiment of a method for embedding an external video stream within a main video of a certain scene so as to create an illusion of the external video being projected on a flat side of a three-dimensional (3D) object appearing in the main video. The method includes: In step 1021, reshaping a sequence of images 10*im*1, 10*im*2, 10*im*3 in the external video stream 10*im* to fit within boundaries of respective markings 2*mrk*1, 2*mrk*2, 2*mrk*3 associated with a video-projection-area 2*vpr* on the flat side of the 3D object 2model9. In step 1022, embedding 2*emb* each reshaped image 1*lim*1, 1*lim*2, 1*lim*3 within the main video 9*im*, in conjunction with the respective marking 2*mrk*1, 2*mrk*2, 2*mrk*3 associated with the video-projection-area, thereby creating the illusion of the external video 10*im* being projected on the flat side of the 3D object 2model9 in the main video 9*im*. In step 1023, streaming out the main video 9*im*', with the external video 10*im* now embedded therewith, to an external device.

In one embodiment, the method further comprises: receiving the external video 10*im*, including the markings 2*mrk*1, 2*mrk*2, 2*mrk*3, as an input stream comprising the sequence of images.

In one embodiment, said receiving of the external video 10*im* as an input stream and consequently streaming out of the main video 9*im*', with the external video now embedded therewith, are done concurrently.

In one embodiment, said reshaping and embedding of the sequence of images 10*im*1, 10*im*2, 10*im*3 into the main video 9*im* is done in real-time and concurrently to said streaming out of the main video 9*im'*.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

At least some of the processes and/or steps disclosed herein may be realized as, or in conjunction with, a program, code, and/or executable instructions, to be executed by a computer, several computers, servers, logic circuits, etc. This includes, but is not limited to, any system, method, or apparatus disclosed herein.

Various processes or steps may be embodied as a non-transitory computer readable storage medium that stores the program, code, and/or executable instructions. This medium may include any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

The non-transitory computer readable medium or media may be transportable, such that the program or programs stored thereon may be loaded onto one or more different computers or other processors to implement various aspects described above. In some embodiments, the program, code, and/or executable instructions may be loaded electronically, e.g., via a network, into the non-transitory computer readable medium or media.

The invention claimed is:

1. A system operative to integrate a sequence of two-dimensional (2D) images of a real three-dimensional (3D) object into a synthetic 3D scene, comprising:

an image capturing sub-system configured to generate a sequence of images of a real object over a certain period and to extract at least one type of spatial information associated with the real object;

a tracking sub-system configured to track movement and orientation of the image capturing sub-system during said certain period;

a 3D rendering sub-system comprising a storage space operative to store a 3D model of a synthetic scene; and an image processing sub-system configured to generate, per each of the images in said sequence, a respective 3D-renderable object having a flat side that is shaped and texture-mapped according to the respective image of the real object, thereby creating a sequence of 3D-renderable objects that appear as the sequence of images of the real object when viewed from a viewpoint that is perpendicular to said flat side;

wherein the system is configured to utilize the spatial information, together with said movement and orientation tracked, in order to:

derive a sequence of virtual viewpoints that mimic said movement and orientation tracked;

place and orient, in conjunction with said storage space, the sequence of 3D-renderable objects in the 3D model of the synthetic scene so as to cause the shaped and texture-mapped flat side of each of the 3D-renderable objects to face a respective one of the virtual viewpoints; and render a sequence of synthetic images, using the 3D rendering sub-system and in conjunction with the 3D model of the synthetic scene now including the sequence of 3D-renderable objects, from a set of rendering viewpoints that matches the sequence of virtual viewpoints mimicking said movement and orientation tracked;

thereby creating a visual illusion that the real object is located in the synthetic scene.

2. The system of claim 1, wherein said 3D-renderable object is a 3D object having a flat side.

3. The system of claim 1, wherein:

the image processing sub-system comprises a respective storage space; and as part of said generation of the 3D-renderable objects having the flat sides that are shaped and texture-mapped according to the images of the real object, the image processing sub-system is further configured to:

detect boundaries of the object in the images using a machine learning model stored in said respective storage space; and remove, in conjunction with said boundaries detected, a background appearing in the images, thereby being left with a representation of the object itself that is operative to constitute the flat sides that are shaped and texture-mapped according to the object itself.

4. The system of claim 1, wherein said 3D model of the synthetic scene comprises various other 3D items, in which at least one of the other 3D items partially blocks, in a visual sense, at least some of the 3D-renderable objects in the 3D model when viewed from said virtual viewpoints, and in which such partial blockage is inherently translated, during said rendering sequence, to synthetic images of the 3D-renderable objects that are partially obscured by said at least one item.

5. The system of claim 1, wherein said at least one type of spatial information associated with the real object comprises at least one of: (i) distance from the image capturing sub-system and (ii) height above ground.

6. The system of claim 1, wherein said real object comprises at least one of: (i) a person, (ii) a group of persons, (iii) animals, and (iv) inanimate objects such as furniture and vehicles.

7. The system of claim 1, wherein said image capturing sub-system comprises a camera of a smartphone.

8. The system of claim 7, wherein said tracking sub-system comprises at least part of an inertial positioning system integrated in the smartphone.

9. The system of claim 8, wherein said inertial positioning system comprises at least one of: (i) at least one accelerometer, (ii) a gyroscope, and (iii) a visual simultaneous localization and mapping (VSLAM) sub-system.

10. The system of claim 7, wherein said image capturing sub-system further comprises a light detection and ranging (LIDAR) sensor integrated in the smartphone and operative to facilitated said extraction of the at least one type of spatial information.

11. The system of claim 7, wherein said 3D rendering sub-system is a rendering server communicatively connected with said smartphone.

12. The system of claim 7, wherein said image processing sub-system is a part of a processing unit integrated in the smartphone and comprising at least one of: (i) a central processing unit (CPU), (ii) a graphics processing unit (GPU), and (iii) an AI processing engine.

13. The system of claim 1, wherein said 3D-renderable object is a two-dimensional (2D) surface constituting a 2D sprite of the real object.

14. The system of claim 13, wherein:

the image processing sub-system is further configured to generate and place a 2D normals map upon the 2D sprite, in which said 2D normals map is operative to inform the 3D rendering sub-system regarding which 3D direction each point in the texture map of the 2D sprite is facing; and the 3D rendering sub-system is further configured to use said 2D normals map, in conjunction with said rendering of said sequence of synthetic images, to generate an illusion of depth using lighting effects.

15. The system of claim 14, wherein:

the image processing sub-system comprises a respective storage space; and said 2D normals map generation is done in the image processing sub-system using a machine learning model that is stored in said respective storage space and that is operative to receive the texture map of the 2D sprite and extrapolate said normals maps from said texture map received.

16. The system of claim 14, wherein said lighting effects are associated with lighting sources embedded in the 3D model of the synthetic scene, in which said lighting sources are operative to interact with the normals maps of the 2D sprite, in conjunction with said rendering of said sequence of synthetic images, to facilitate said illusion of depth and to enhance said visual illusion that the real object is located in the synthetic scene.

17. The system of claim 13, wherein:

the image processing sub-system is further configured to generate and place a shadow mesh matching an expected 3D extrapolation of the 2D sprite, in which said shadow mesh is operative to inform the 3D rendering sub-system regarding a shadow that the 2D sprite would have casted as a 3D body; and the 3D rendering sub-system is further configured to use said shadow mesh, in conjunction with said rendering of said sequence of synthetic images, to generate an illusion of a shadow casted by the real object.

18. The system of claim 17 wherein:

the image processing sub-system comprises a respective storage space; and said 3D extrapolation is done in the image processing sub-system using a machine learning model that is stored in said respective storage space and that is operative to receive at least the texture map of the 2D sprite and extrapolate said shadow mesh from said texture map received.

19. The system of claim 13, wherein said 3D model of the synthetic scene comprises various other 3D elements, in which at least one of the other 3D elements is a reflective surface such as a body of water and/or a flat polished surface, and in which an image of the 2D sprite is reflected from the reflective surface in conjunction with said rendering of said sequence of synthetic images and further in conjunction with lighting sources embedded in the 3D model of the synthetic scene, thereby enhancing said visual illusion that the real object is located in the synthetic scene.

* * * * *